(12) United States Patent
Zhu et al.

(10) Patent No.: US 10,698,086 B1
(45) Date of Patent: Jun. 30, 2020

(54) PHOTONIC INTEGRATED CIRCUIT ILLUMINATOR

(71) Applicant: Facebook Technologies, LLC, Menlo Park, CA (US)

(72) Inventors: Zhaoming Zhu, Redmond, WA (US); Michael Hall, Seattle, WA (US); Qing Chao, Redmond, WA (US)

(73) Assignee: FACEBOOK TECHNOLOGIES, LLC, Menlo Park, CA (US)

( * ) Notice: Subject to any disclaimer, the term of this patent is extended or adjusted under 35 U.S.C. 154(b) by 0 days.

(21) Appl. No.: 16/250,640

(22) Filed: Jan. 17, 2019

Related U.S. Application Data

(60) Provisional application No. 62/669,301, filed on May 9, 2018.

(51) Int. Cl.
*G01S 7/48* (2006.01)
*G01S 7/481* (2006.01)
(Continued)

(52) U.S. Cl.
CPC ............ *G01S 7/4814* (2013.01); *G01S 17/89* (2013.01); *G02B 6/005* (2013.01)

(58) Field of Classification Search
CPC .......... G02B 6/124; G02B 2006/12107; G02B 6/12004; G02B 6/34; G02B 2006/12147; G02B 6/4206; G02B 2027/0178; G02B 27/0172; G02B 6/4214; G02B 2006/12164; G02B 2027/0116; G02B 27/141; G02B 6/13; G02B 6/12007; G02B 6/42; G02B 2027/011; G02B 27/4205; G02B 6/1228; G02B 2027/015; G02B 27/0176; G02B 6/4215; G02B 26/101; G02B 27/1006; G02B 6/125; G02B 6/30; G02B 6/12002; G02B 6/2773; G02B 6/305; G02B 2006/12061; G02B 2027/0114; G02B 2027/0134; G02B 2027/014; G02B 27/0101; G02B 27/102; G02B 27/1086;
(Continued)

(56) References Cited

U.S. PATENT DOCUMENTS 9,341,786 B1 * 5/2016 Gamache ................. G02B 6/30
2013/0208256 A1 * 8/2013 Mamidipudi ......... G01S 7/4811
356/4.01
(Continued)

*Primary Examiner* — Michael P Stafira
(74) *Attorney, Agent, or Firm* — Kilpatrick Townsend & Stockton LLP

(57) ABSTRACT

Methods and systems for providing illumination for depth sensing are provided. In one example, an apparatus comprises an illuminator, an optical sensor, and a controller. The illuminator comprises a photonic integrated circuit (PIC) and a diffractive optical element (DOE). The PIC including a laser source and at least one waveguide including optical turning features. The at least one waveguide propagates light transmitted by the laser source along a first axis parallel to a top surface of the PIC. The optical turning features diverts the light to form collimated light beams to exit the at least one waveguide and the top surface along a second axis. The DOE can diffract and project the collimated light beams. The optical sensor can detect the collimated light beams reflected off an object. The controller can determine a depth of the object with respect to the apparatus based on the detection.

20 Claims, 17 Drawing Sheets

(51) Int. Cl.
*G01S 17/89* (2020.01)
*F21V 8/00* (2006.01)

(58) Field of Classification Search
CPC ........ G02B 27/18; G02B 6/122; G02B 6/126; G02B 2006/12069; G02B 2006/12121; G02B 2027/0112; G02B 6/4251; G02B 2006/12104; G02B 6/29395; G02B 6/423; G02B 6/4249; G02B 6/4292; G02B 2006/12157; G02B 6/136; G02B 6/14; G02B 6/2938; G02B 6/4204; G02B 2006/12102; G02B 2006/12126; G02B 2006/12152; G02B 6/132; G02B 6/2726; G02B 6/29305; G02B 6/29343; G02B 6/3885; G02B 6/4208; G02B 6/4213; G02B 6/4231; G02B 2006/12092; G02B 2006/12123; G02B 2006/1215; G02B 5/1857; G02B 6/1225; G02B 6/293; G02B 6/29316; G02B 6/29328; G02B 6/29338; G02B 6/3534; G02B 6/3596; G02B 6/3628; G02B 6/3636; G02B 6/3672; G02B 6/3821; G02B 6/3825; G02B 6/3874; G02B 6/3881; G02B 6/3882; G02B 6/422; G02B 6/4225; G02B 6/425; G02B 6/4257; G02B 6/4274; G02B 6/428; G02B 6/43; G02B 2006/12038; G02B 2006/12078; G02B 2006/12109; G02B 2006/1213; G02B 2006/12135; G02B 2006/12138; G02B 2027/0147; G02B 21/0032; G02B 21/0072; G02B 26/0841; G02B 26/0875; G02B 26/105; G02B 27/0012; G02B 27/087; G02B 27/0927; G02B 27/0938; G02B 27/0994; G02B 27/42; G02B 30/56; G02B 5/18; G02B 6/0025; G02B 6/003; G02B 6/0031; G02B 6/0061; G02B 6/02033; G02B 6/02076; G02B 6/02285; G02B 6/102; G02B 6/12; G02B 6/12009; G02B 6/12016; G02B 6/12019; G02B 6/38; G02B 6/24; G02B 6/262; G02B 6/2746; G02B 6/2766; G02B 6/2786; G02B 6/2861; G02B 6/29302; G02B 6/29308; G02B 6/2931; G02B 6/29313; G02B 6/29314; G02B 6/29341; G02B 6/29389; G02B 6/32; G02B 6/3504; G02B 6/3508; G02B 6/3552; G02B 6/3598; G02B 6/3652; G02B 6/4202; G02B 6/4228; G02B 6/4243; G02B 6/4245; G02B 6/4269; G02B 6/4403; G01S 17/89; G01S 17/88; G01S 17/32; G01S 17/34; G01S 17/42; G01S 17/931; G01S 7/4808; G01S 7/4811; G01S 7/4816; G01S 7/4817; G01S 7/4818; G01S 7/484; G01S 7/4863; G01S 7/4911; G01S 17/04; G01S 17/10; G01S 17/18; G01S 17/26; G01S 17/66; G01S 17/93; G01S 7/481; G01S 7/4814; G01S 7/4815; G01S 7/4865; G01S 7/4914; G01J 3/1895; G01J 3/2803; G01J 3/00; G01J 3/0259; G01J 3/433; G01J 1/4257; G01J 2003/1265; G01J 2003/2813; G01J 2003/4334; G01J 3/0205; G01J 3/021; G01J 3/0218; G01J 3/0229; G01J 3/0286; G01J 3/0297; G01J 3/10; G01J 3/12; G01J 3/18; G01J 3/2823; G01J 3/42; G01J 3/44; G01J 5/20; G01J 21/255; G01J 15/1434; G01J 15/1456; G01J 15/1484; G01J 2015/0065; G01J 2015/1006; G01J 2015/144; G01J 2015/149; G01J 2021/458; G01J 2021/7789; G01J 21/27; G01J 21/359; G01J 21/45; G01J 21/59; G01J 21/65; G01J 21/95684; G01J 2201/06113; G01J 2201/0612; G01J 2201/0635; G01J 2201/0638; G01J 25/18; G01J 27/125; G01J 27/18; G01J 27/22; G01J 27/4141; G01J 33/54373; G01J 33/551; G01B 11/02; G01B 11/18; G01B 11/22; G01B 11/2441; G01B 2290/60; G01B 9/02004; G01B 9/02007; G01B 9/02083; G01B 9/02091

See application file for complete search history.

(56) References Cited

U.S. PATENT DOCUMENTS

| | | | |
|---|---|---|---|
| 2017/0363823 A1* | 12/2017 | Mentovich | G02B 6/4245 |
| 2019/0179150 A1* | 6/2019 | Pierer | H01S 5/0226 |
| 2019/0196200 A1* | 6/2019 | Pierer | H01S 5/423 |
| 2019/0339327 A1* | 11/2019 | Huebner | G02B 6/34 |
| 2019/0377135 A1* | 12/2019 | Mansouri Rad | G02B 6/354 |
| 2020/0026080 A1* | 1/2020 | Pierer | H01S 5/02292 |

* cited by examiner

PHOTONIC INTEGRATED CIRCUIT ILLUMINATOR

RELATED APPLICATION

This patent application claims priority to U.S. Provisional Patent Application Ser. No. 62/669,301, filed May 9, 2018, entitled "DEPTH SENSING ILLUMINATOR BASED ON PHOTONIC INTEGRATED CHIP," which is assigned to the assignee hereof and is incorporated herein by reference in its entirety for all purposes.

BACKGROUND

The disclosure relates generally to photonic integrated circuits, and more specifically to a photonic integrated circuit configured as an illuminator.

An illuminator generally refers to a source of light including visible light and non-visible light (e.g., near infra-red). Illuminator can be used for different applications, such as depth sensing. An illuminator can be integrated in a mobile platform, such as mobile phone, headset, head mounted display (HMD), glasses, etc., to enable mobile applications that use depth sensing, such as artificial reality applications. The size, weight, and power consumption of an illuminator can be crucial in integrating the illuminator with the mobile platform.

SUMMARY

The present disclosure relates to photonic integrated circuits, and more specifically to a photonic integrated circuit configured as an illuminator which can be integrated in a mobile platform.

In one example, an apparatus is provided. The apparatus comprises a photonic integrated circuit (PIC), the PIC including a laser source and at least one waveguide, the at least one waveguide including optical turning features, the at least one waveguide configured to propagate light transmitted by the laser source along a first axis parallel to a top surface of the PIC, and the optical turning features configured to divert the light to form collimated light beams that propagate along a second axis to exit the at least one waveguide and the top surface. The apparatus further includes a diffractive optical element (DOE) positioned over the top surface of the PIC along the second axis and configured to diffract the collimated light beams and output the diffracted collimated light beams.

In some aspects, the laser source comprises a light emitting surface perpendicular to the top surface of the PIC. The laser source is configured to emit the light via the light emitting surface to the at least one waveguide.

In some aspects, the DOE is configured to diffract the collimated light beams to form structured light having pre-determined patterns for image-based depth sensing.

In some aspects, the DOE is configured to diffract the collimated light beams to project a blanket of diffused light for time-of-flight measurement.

In some aspects, the optical turning features are configured such that the second axis is perpendicular to the top surface of the PIC.

In some aspects, the optical turning features include optical gratings. A distance between two of the optical gratings along the first axis is configured based on a target beam width along the first axis.

In some aspects, the at least one waveguide comprises a plurality of waveguides arranged along a third axis, the third axis being perpendicular to the first axis and parallel with the top surface of the PIC, each of the plurality of waveguides comprising optical turning features. Each of the plurality of waveguides is configured to propagate the light transmitted by the laser source along the first axis parallel with the top surface of the PIC. The optical turning features of the plurality of waveguides are configured to divert the light propagated in the plurality of waveguides to form a two-dimensional array of collimated light beams that propagate along the second axis to exit the plurality of waveguides and the top surface of the PIC.

In some aspects, a distance between two of the plurality of waveguides along the third axis is configured based on a target beam width along the third axis.

In some aspects, the apparatus further comprises a star coupler coupled with the laser source with the plurality of waveguides.

In some aspects, an angle between the top surface of the PIC and the second axis along which the two-dimensional array of collimated light beams propagate is adjustable.

In some aspects, the apparatus further comprises a plurality of phase shifters. Each of the plurality of phase shifters is coupled with each of the plurality of waveguides. Each of the plurality of phase shifter is configured to introduce a phase delay in each of the collimated light beams that exits from the each of the plurality of waveguides.

In some aspects, the apparatus further comprises a phase shifter controller. The phase shifter controller is configured to set the phase delay at each of the plurality of phase shifters to set the angle between the second axis and the light emitting surface.

In some aspects, the PIC includes a Silicon substrate. The laser source comprises materials from one of Groups III, IV, or V. The DOE may include a lens, a light diffuser panel, etc.

In one example, an apparatus is provided. The apparatus comprises an illuminator, an optical sensor, and a controller. The illuminator comprises a photonic integrated circuit (PIC), the PIC including a laser source and at least one waveguide, the at least one waveguide including optical turning features, the at least one waveguide configured to propagate light transmitted by the laser source along a first axis parallel to a top surface of the PIC, and the optical turning features configured to divert the light to form collimated light beams that propagate along a second axis to exit the at least one waveguide and the top surface. The illuminator further comprises a diffractive optical element (DOE) over the top surface of the PIC along the second axis and configured to diffract the collimated light beams and project the diffracted collimated light beams towards an object. The optical sensor is configured to generate a detection output based on detecting at least part of the diffracted collimated light beams reflected off the object. The controller is configured to determine a depth of the object with respect to the apparatus based on the detection output.

In some aspects, the DOE is configured to diffract the collimated light beams to form structured light having pre-determined patterns. The optical sensor further comprises a pixel array configured to obtain an image of the pre-determined patterns on a surface of the object based on detecting at least part of the diffracted collimated light beams reflected off the surface of the object. The controller is configured to estimate a distance between the illuminator and each of a plurality of positions on the surface of the object based on the image to determine the depth.

In some aspects, the DOE is configured to diffract the collimated light beams to form a blanket of light. The optical sensor is configured to determine time-of-arrival information of photons of the blanket of light reflected off a surface of the object. The controller is configured to estimate a distance between the illuminator and each of a plurality of positions on the surface of the object based on the time-of-arrival information.

In one example, a method is provided. The method comprises: controlling a laser source of a photonic integrated circuit (PIC) to transmit light; propagating, by at least one waveguide of the PIC, the light along a first axis parallel to a top surface of the PIC; diverting, by optical turning features of the at least one waveguide of the PIC, the light from the first axis to a second axis as collimated light beams to exit the at least one waveguide and the top surface; diffracting, by a diffracted optical element (DOE) positioned over the top surface of the PIC along the second axis, the collimated light beams to form output light; and projecting, by the DOE, the output light.

BRIEF DESCRIPTION OF THE DRAWINGS

Illustrative embodiments are described with reference to the following figures.

Figure 1A:
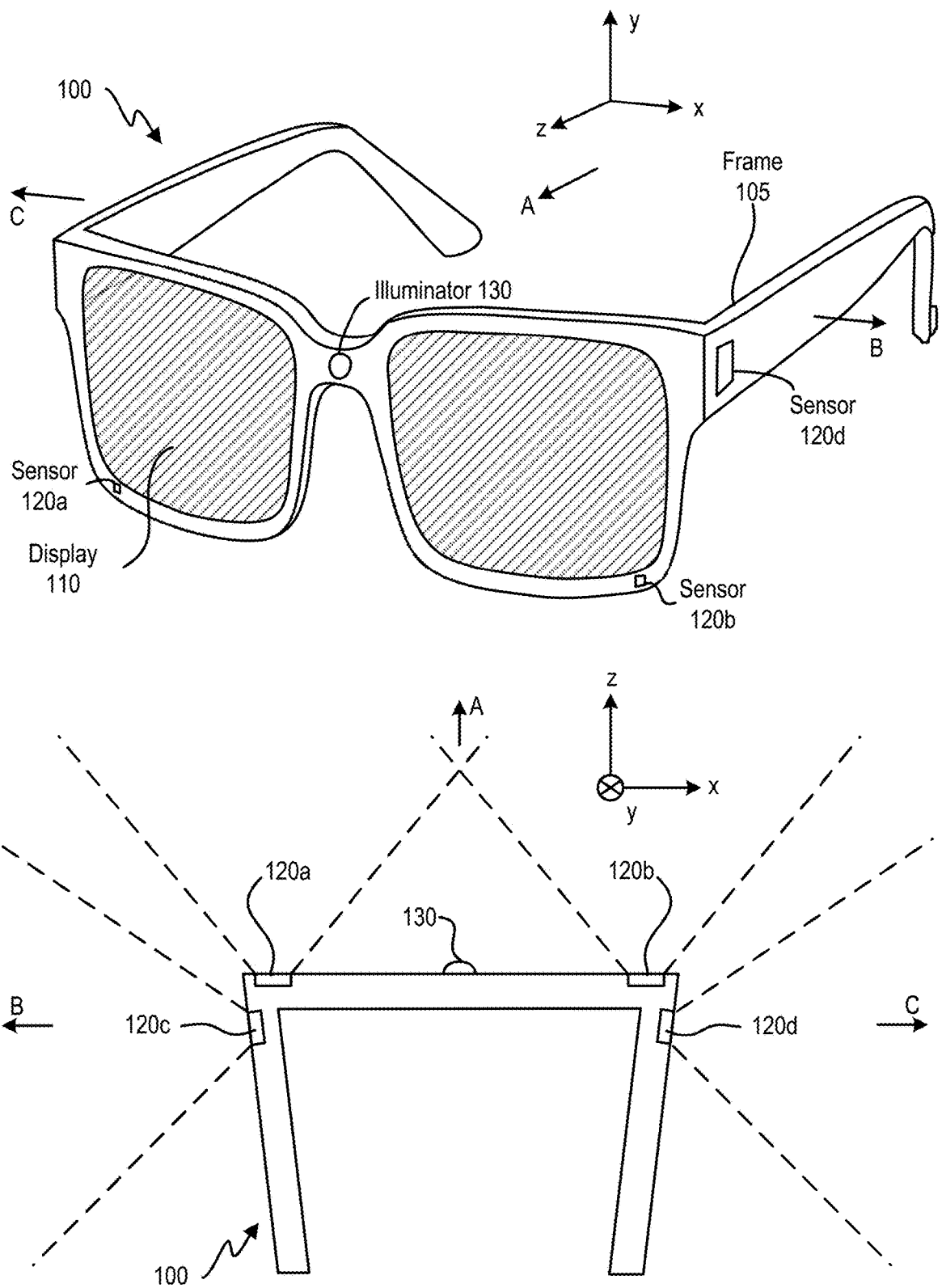
FIGS. 1A and 1B are diagrams of an example of a near-eye display.

The figures depict embodiments of the present disclosure for purposes of illustration only. One skilled in the art will readily recognize from the following description that alternative embodiments of the structures and methods illustrated may be employed without departing from the principles, or benefits touted, of this disclosure.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

In the following description, for the purposes of explanation, specific details are set forth in order to provide a thorough understanding of certain inventive embodiments. However, it will be apparent that various embodiments may be practiced without these specific details. The figures and description are not intended to be restrictive.

This disclosure relates to a photonic integrated circuit configured as an illuminator which can be integrated in a mobile platform to enable mobile applications related to depth sensing, such as artificial reality applications. The illuminator may include a photonic integrated circuit (PIC) and a diffractive optical element (DOE). The PIC may include a laser source and at least one waveguide. The laser source may include, for example, a laser diode (e.g., a vertical-cavity surface-emitting laser (VCSEL), or other semiconductor laser source. The at least one waveguide may include optical turning features such as, for example, diffractive gratings, optical facets, refractive index structures, volume holograms, optical beam splitting prisms, etc. The at least one waveguide can propagate light transmitted by the laser diode along a first axis parallel to a surface of the PIC, whereas the optical turning feature can divert the light from the laser diode to form collimated light beams that propagate along a second axis to exit the at least one waveguide and the surface. The DOE can be positioned over the surface of the PIC and the optical turning features to receive the collimated light beams, diffract the collimated light beams, and output the diffracted collimated light beams.

An illuminator according to examples of the present disclosure can be used for different depth sensing techniques, such as based on structured light and time-of-flight measurement. For example, the illuminator can be integrated with an image sensor on a mobile platform. The DOE of the illuminator can be configured to diffract the collimated light beams to form structured light having pre-determined patterns. The illuminator can project the structured light on a surface of an object. The image sensor can capture an image of the pre-determined patterns on the surface of the object. A controller can analyze, for example, a distortion of the patterns caused by the reflection of the structured light from the surface, and based on the distortion, estimate a distance between the illuminator (and the mobile platform) and each of a plurality of points on the surface.

As another example, the DOE can be configured to diffract the collimated light beams to project a blanket of diffused light onto the surface of the object. Different locations on the surface of the object can reflect the diffused light towards the image sensor. Each pixel of the image sensor can generate an indication of when a first photon of the reflected light is received at the pixel, and a time difference between when the illuminator projects the blanket of light and when light reflected from a particular location on the surface of the object is received at the pixel can be determined. The time difference can be used to determine a distance between that particular location and the illuminator (and the mobile platform).

An illuminator according to examples of the present disclosure can provide numerous technical advantages. First, the illuminator can generate collimated light beams which can be focused (e.g., having narrow beam width), which can improve the resolution of depth sensing. Moreover, compared with an implementation in which a collimator lens is stacked on top of and at a focal distance from a vertical cavity surface-emitting laser (VCSEL), an illuminator according to examples of the present disclosure can have reduced vertical height by eliminating the need for a collimator lens, which can reduce the form factor of the illuminator. Further, an edge-emitting laser diode (EELD) can be used to provide the light source for the illuminator. An EELD typically has a higher power conversion ratio than a VCSEL, which allows the illuminator to be more power efficient. All these can facilitate the integration of the illuminator on a mobile platform for which small form factor, low weight, and low power are critical.

Examples of the disclosure may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, any of which may be presented in a single channel or in multiple channels (such as stereo video that produces a three-dimensional effect to the viewer). Additionally, in some examples, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

FIG. 1A is a diagram of an embodiment of a near-eye display 100. Near-eye display 100 presents media to a user. Examples of media presented by near-eye display 100 include one or more images, video, and/or audio. In some embodiments, audio is presented via an external device (e.g., speakers and/or headphones) that receives audio information from the near-eye display 100, a console, or both, and presents audio data based on the audio information. Near-eye display 100 is generally configured to operate as a virtual reality (VR) display. In some embodiments, near-eye display 100 is modified to operate as an augmented reality (AR) display and/or a mixed reality (MR) display.

Near-eye display 100 includes a frame 105 and a display 110. Frame 105 is coupled to one or more optical elements. Display 110 is configured for the user to see content presented by near-eye display 100. In some embodiments, display 110 comprises a waveguide display assembly for directing light from one or more images to an eye of the user.

Near-eye display 100 further includes image sensors 120a, 120b, 120c, and 120d. Each of image sensors 120a, 120b, 120c, and 120d may include a pixel array configured to generate image data representing different fields of views along different directions. For example, image sensors 120a and 120b may be configured to provide image data representing two field of views towards a direction A along the Z axis, whereas sensor 120c may be configured to provide image data representing a field of view towards a direction B along the X axis, and sensor 120d may be configured to provide image data representing a field of view towards a direction C along the X axis.

In some embodiments, sensors 120a-120d can be configured as input devices to control or influence the display content of the near-eye display 100, to provide an interactive VR/AR/MR experience to a user who wears near-eye display 100. For example, sensors 120a-120d can generate physical image data of a physical environment in which the user is located. The physical image data can be provided to a location tracking system to track a location and/or a path of movement of the user in the physical environment. A system can then update the image data provided to display 110 based on, for example, the location and orientation of the user, to provide the interactive experience. In some embodiments, the location tracking system may operate a SLAM algorithm to track a set of objects in the physical environment and within a view of field of the user as the user moves within the physical environment. The location tracking system can construct and update a map of the physical environment based on the set of objects, and track the location of the user within the map. By providing image data corresponding to multiple fields of views, sensors 120a-120d can provide the location tracking system a more holistic view of the physical environment, which can lead to more objects to be included in the construction and updating of the map. With such an arrangement, the accuracy and robustness of tracking a location of the user within the physical environment can be improved.

In some embodiments, near-eye display 100 may further include one or more active illuminators 130 to project light into the physical environment. The light projected can be associated with different frequency spectrums (e.g., visible light, infra-red light, ultra-violet light, etc.), and can serve various purposes. For example, illuminator 130 may project light in a dark environment (or in an environment with low intensity of infra-red light, ultra-violet light, etc.) to assist sensors 120a-120d in capturing images of different objects within the dark environment to, for example, enable location tracking of the user. Illuminator 130 may project certain markers onto the objects within the environment, to assist the location tracking system in identifying the objects for map construction/updating.

In some embodiments, illuminator 130 may also enable stereoscopic imaging. For example, one or more of sensors 120a or 120b can include both a first pixel array for visible light sensing and a second pixel array for infra-red (IR) light sensing. The first pixel array can be overlaid with a color filter (e.g., a Bayer filter), with each pixel of the first pixel array being configured to measure intensity of light associated with a particular color (e.g., one of red, green or blue colors). The second pixel array (for IR light sensing) can also be overlaid with a filter that allows only IR light through, with each pixel of the second pixel array being configured to measure intensity of IR lights. The pixel arrays can generate an RGB image and an IR image of an object, with each pixel of the IR image being mapped to each pixel of the RGB image. Illuminator 130 may project a set of IR markers on the object, the images of which can be captured by the IR pixel array. Based on a distribution of the IR markers of the object as shown in the image, the system can estimate a distance of different parts of the object from the IR pixel array, and generate a stereoscopic image of the object based on the distances. Based on the stereoscopic image of the object, the system can determine, for example, a relative position of the object with respect to the user, and can update the image data provided to display 100 based on the relative position information to provide the interactive experience.

As discussed above, near-eye display 100 may be operated in environments associated with a very wide range of light intensities. For example, near-eye display 100 may be operated in an indoor environment or in an outdoor environment, and/or at different times of the day. Near-eye display 100 may also operate with or without active illuminator 130 being turned on. As a result, image sensors 120a-120d may need to have a wide dynamic range to be able to operate properly (e.g., to generate an output that correlates with the intensity of incident light) across a very wide range of light intensities associated with different operating environments for near-eye display 100.

Figure 1B:
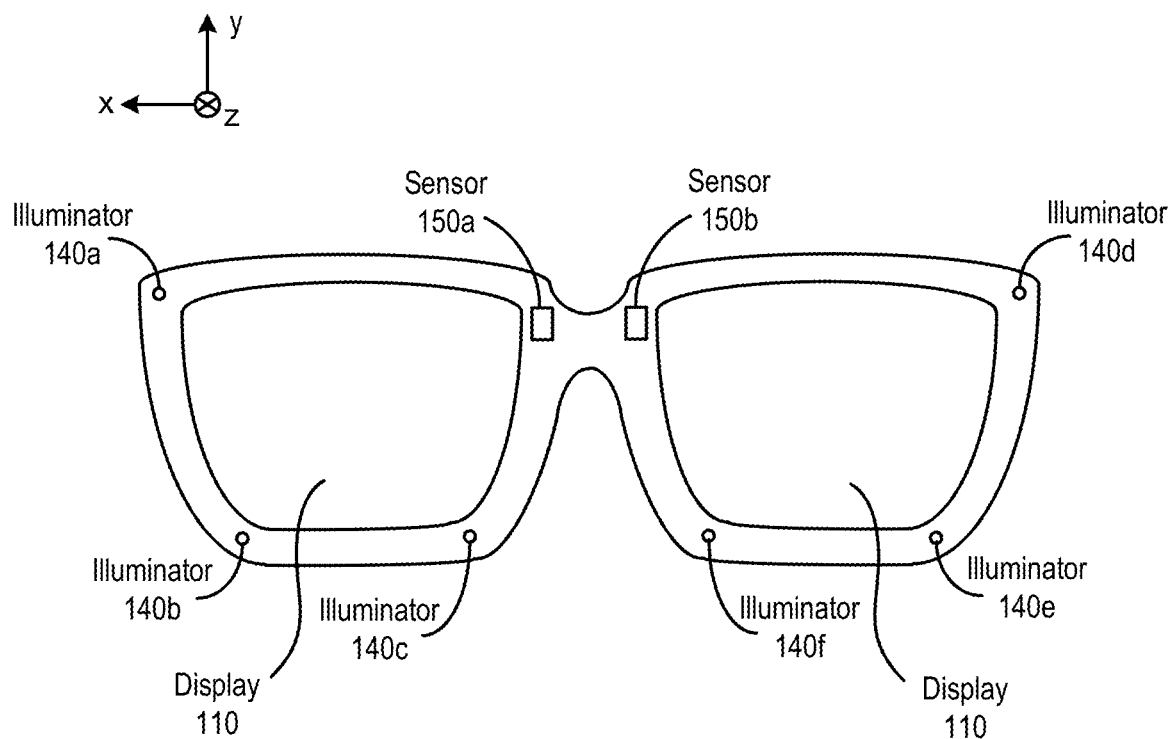

FIG. 1B is a diagram of another embodiment of near-eye display 100. FIG. 1B illustrates a side of near-eye display 100 that faces the eyeball(s) 135 of the user who wears near-eye display 100. As shown in FIG. 1B, near-eye display 100 may further include a plurality of illuminators 140a, 140b, 140c, 140d, 140e, and 140f. Near-eye display 100 further includes a plurality of image sensors 150a and 150b. Illuminators 140a, 140b, and 140c may emit lights of certain frequency range (e.g., NIR) towards direction D (which is opposite to direction A of FIG. 1A). The emitted light may be associated with a certain pattern, and can be reflected by the left eyeball of the user. Sensor 150a may include a pixel array to receive the reflected light and generate an image of the reflected pattern. Similarly, illuminators 140d, 140e, and 140f may emit NIR lights carrying the pattern. The NIR lights can be reflected by the right eyeball of the user, and may be received by sensor 150b. Sensor 150b may also include a pixel array to generate an image of the reflected pattern. Based on the images of the reflected pattern from sensors 150a and 150b, the system can determine a gaze point of the user, and update the image data provided to display 100 based on the determined gaze point to provide an interactive experience to the user.

As discussed above, to avoid damaging the eyeballs of the user, illuminators 140a, 140b, 140c, 140d, 140e, and 140f are typically configured to output lights of very low intensities. In a case where image sensors 150a and 150b comprise the same sensor devices as image sensors 120a-120d of FIG. 1A, the image sensors 120a-120d may need to be able to generate an output that correlates with the intensity of incident light when the intensity of the incident light is very low, which may further increase the dynamic range requirement of the image sensors.

Moreover, the image sensors 120a-120d may need to be able to generate an output at a high speed to track the movements of the eyeballs. For example, a user's eyeball can perform a very rapid movement (e.g., a saccade movement) in which there can be a quick jump from one eyeball position to another. To track the rapid movement of the user's eyeball, image sensors 120a-120d need to generate images of the eyeball at high speed. For example, the rate at which the image sensors generate an image frame (the frame rate) needs to at least match the speed of movement of the eyeball. As an illustrative example, assuming depth measurement requires at least one image frame, a minimum frame rate of 30 frames/second may be needed to obtain real-time gaze estimation. The high frame rate requires short total exposure time for all of the pixel cells involved in generating the image frame, as well as high speed for converting the sensor outputs into digital values for image generation. Moreover, as discussed above, the image sensors also need to be able to operate at an environment with low light intensity.

Figure 1B:
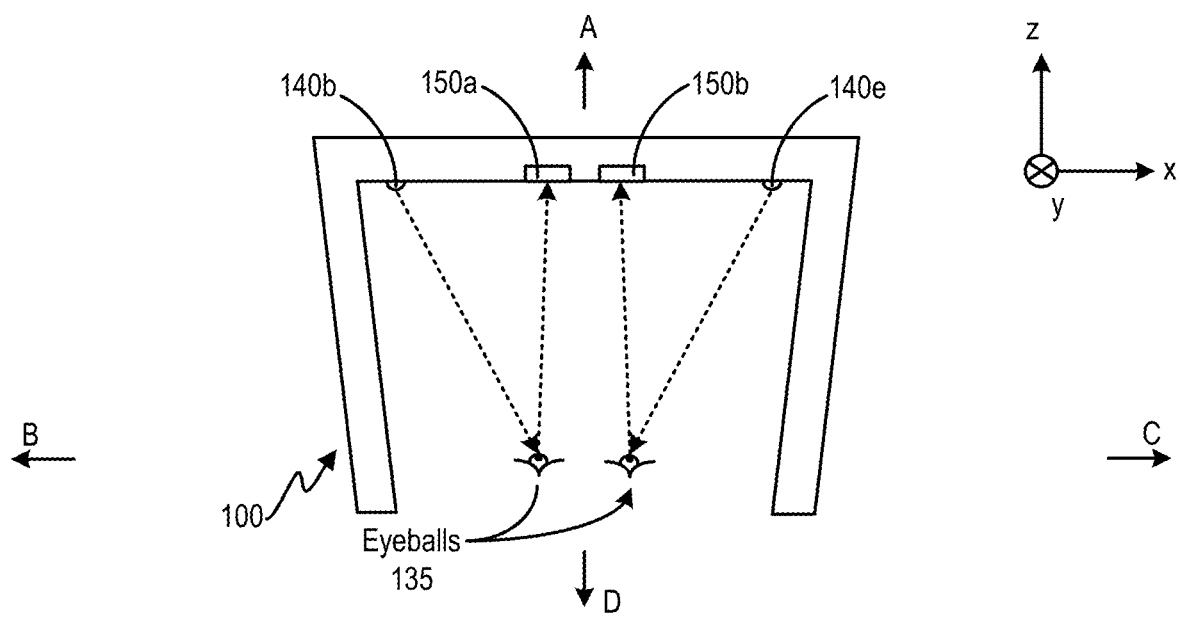
Figure 2:
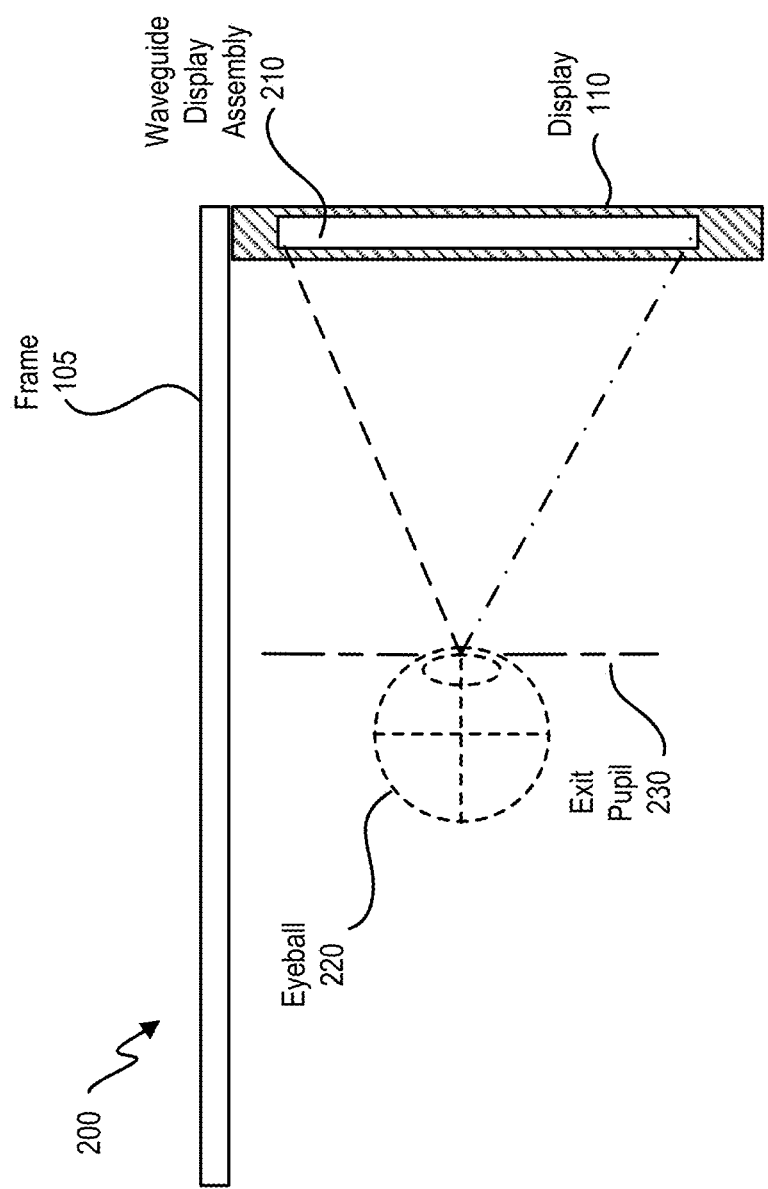
FIG. 2 is an example of a cross section of the near-eye display.

FIG. 2 is an embodiment of a cross section 200 of near-eye display 100 illustrated in FIG. 1. Display 110 includes at least one waveguide display assembly 210. An exit pupil 230 is a location where a single eyeball 220 of the user is positioned in an eyebox region when the user wears the near-eye display 100. For purposes of illustration, FIG. 2 shows the cross section 200 associated eyeball 220 and a single waveguide display assembly 210, but a second waveguide display is used for a second eye of a user.

Waveguide display assembly 210 is configured to direct image light to an eyebox located at exit pupil 230 and to eyeball 220. Waveguide display assembly 210 may be composed of one or more materials (e.g., plastic, glass, etc.) with one or more refractive indices. In some embodiments, near-eye display 100 includes one or more optical elements between waveguide display assembly 210 and eyeball 220.

In some embodiments, waveguide display assembly 210 includes a stack of one or more waveguide displays including, but not restricted to, a stacked waveguide display, a varifocal waveguide display, etc. The stacked waveguide display is a polychromatic display (e.g., a red-green-blue (RGB) display) created by stacking waveguide displays whose respective monochromatic sources are of different colors. The stacked waveguide display is also a polychromatic display that can be projected on multiple planes (e.g., multi-planar colored display). In some configurations, the stacked waveguide display is a monochromatic display that can be projected on multiple planes (e.g., multi-planar monochromatic display). The varifocal waveguide display is a display that can adjust a focal position of image light emitted from the waveguide display. In alternate embodiments, waveguide display assembly 210 may include the stacked waveguide display and the varifocal waveguide display.

Figure 3:
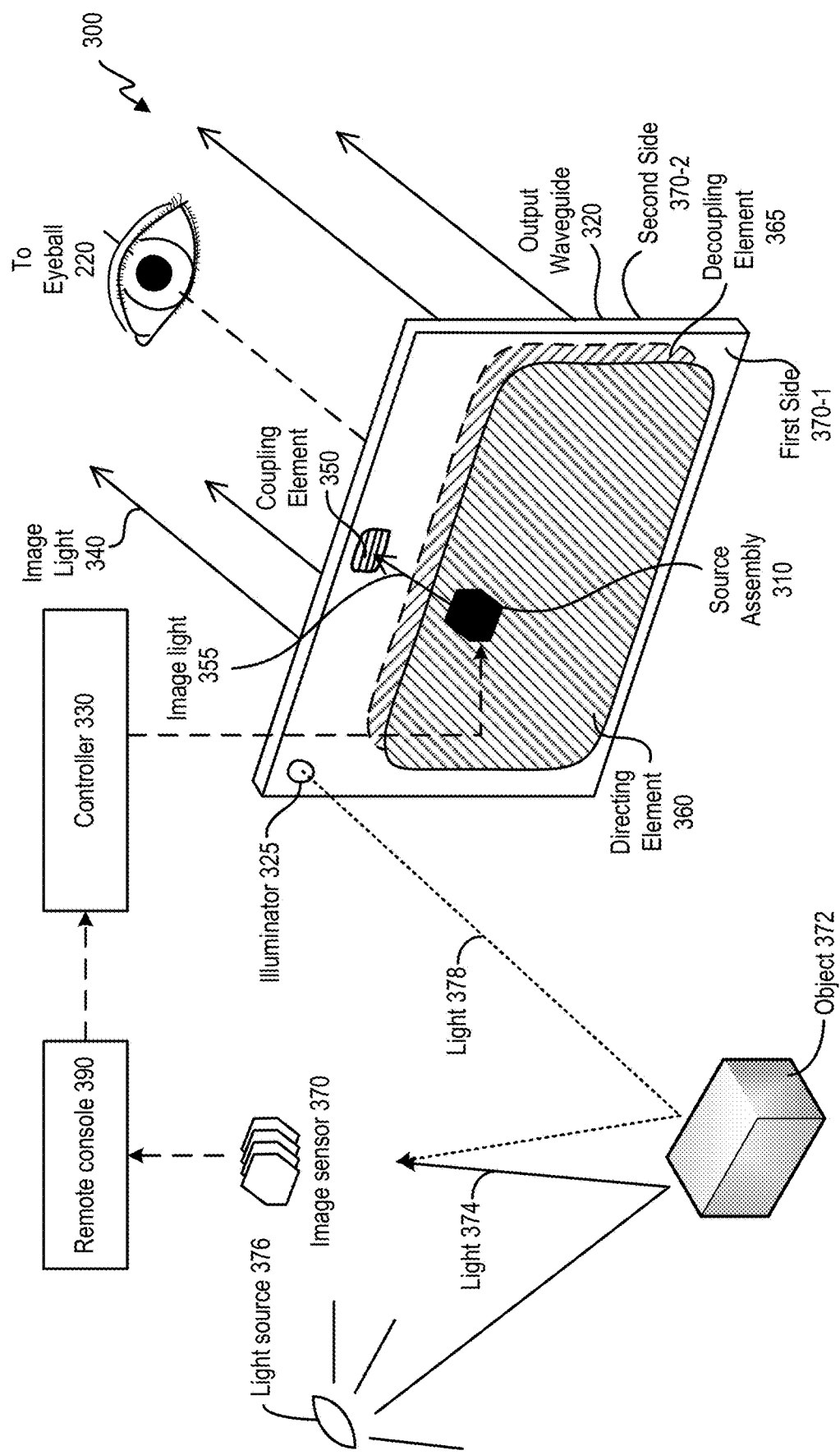
FIG. 3 illustrates an isometric view of an example of a waveguide display with a single source assembly.

FIG. 3 illustrates an isometric view of an embodiment of a waveguide display 300. In some embodiments, waveguide display 300 is a component (e.g., waveguide display assembly 210) of near-eye display 100. In some embodiments, waveguide display 300 is part of some other near-eye display or other system that directs image light to a particular location.

Waveguide display 300 includes a source assembly 310, an output waveguide 320, an illuminator 325, and a controller 330. For purposes of illustration, FIG. 3 shows the waveguide display 300 associated with a single eyeball 220, but in some embodiments, another waveguide display separate, or partially separate, from the waveguide display 300 provides image light to another eye of the user.

Source assembly 310 generates image light 355. Source assembly 310 generates and outputs image light 355 to a coupling element 350 located on a first side 370-1 of output waveguide 320. Output waveguide 320 is an optical waveguide that outputs expanded image light 340 to an eyeball 220 of a user. Output waveguide 320 receives image light 355 at one or more coupling elements 350 located on the first side 370-1 and guides received input image light 355 to a directing element 360. In some embodiments, coupling element 350 couples the image light 355 from source assembly 310 into output waveguide 320. Coupling element 350 may be, e.g., a diffraction grating, a holographic grating, one or more cascaded reflectors, one or more prismatic surface elements, and/or an array of holographic reflectors.

Directing element 360 redirects the received input image light 355 to decoupling element 365 such that the received input image light 355 is decoupled out of output waveguide 320 via decoupling element 365. Directing element 360 is part of, or affixed to, first side 370-1 of output waveguide 320. Decoupling element 365 is part of, or affixed to, second side 370-2 of output waveguide 320, such that directing element 360 is opposed to the decoupling element 365. Directing element 360 and/or decoupling element 365 may be, e.g., a diffraction grating, a holographic grating, one or more cascaded reflectors, one or more prismatic surface elements, and/or an array of holographic reflectors.

Second side 370-2 represents a plane along an x-dimension and a y-dimension. Output waveguide 320 may be composed of one or more materials that facilitate total internal reflection of image light 355. Output waveguide 320 may be composed of e.g., silicon, plastic, glass, and/or polymers. Output waveguide 320 has a relatively small form factor. For example, output waveguide 320 may be approximately 50 mm wide along x-dimension, 30 mm long along y-dimension and 0.5-1 mm thick along a z-dimension.

Controller 330 controls scanning operations of source assembly 310. For example, controller 330 can determine scanning instructions for the source assembly 310. In some embodiments, the output waveguide 320 outputs expanded image light 340 to the user's eyeball 220 with a large field of view (FOV). For example, the expanded image light 340 is provided to the user's eyeball 220 with a diagonal FOV (in x and y) of 60 degrees and/or greater and/or 150 degrees and/or less. The output waveguide 320 is configured to provide an eyebox with a length of 20 mm or greater and/or equal to or less than 50 mm; and/or a width of 10 mm or greater and/or equal to or less than 50 mm.

Moreover, controller 330 also controls image light 355 generated by source assembly 310, based on image data provided by image sensor 370. Image sensor 370 may be located on first side 370-1 and may include, for example, image sensors 120a-120d of FIG. 1A. Image sensors 120a-120d can be operated to perform two-dimensional (2D) sensing and three-dimensional (3D) depth sensing of, for example, an object 372 in front of the user (e.g., facing first side 370-1). For 2D sensing, each pixel cell of image sensors 120a-120d can be operated to generate pixel data representing an intensity of light 374 generated by a light source 376 and reflected off object 372. For 3D depth sensing, each pixel cell of image sensors 120a-120d can be operated to generate pixel data based on light 378 generated by illuminator 325 and reflected off object 372. Image sensors 120a-120d can be operated to perform 2D and 3D sensing at different times, and provide the 2D and 3D image data to a remote console 390 that may be (or may be not) located within waveguide display 300. The remote console may combine the 2D and 3D images to, for example, generate a 3D model of the environment in which the user is located, to track a location and/or orientation of the user, etc. The remote console may determine the content of the images to be displayed to the user based on the information derived from the 2D and 3D images. The remote console can transmit instructions to controller 330 related to the determined content. Based on the instructions, controller 330 can control the generation and outputting of image light 355 by source assembly 310, to provide an interactive experience to the user.

Figure 4:
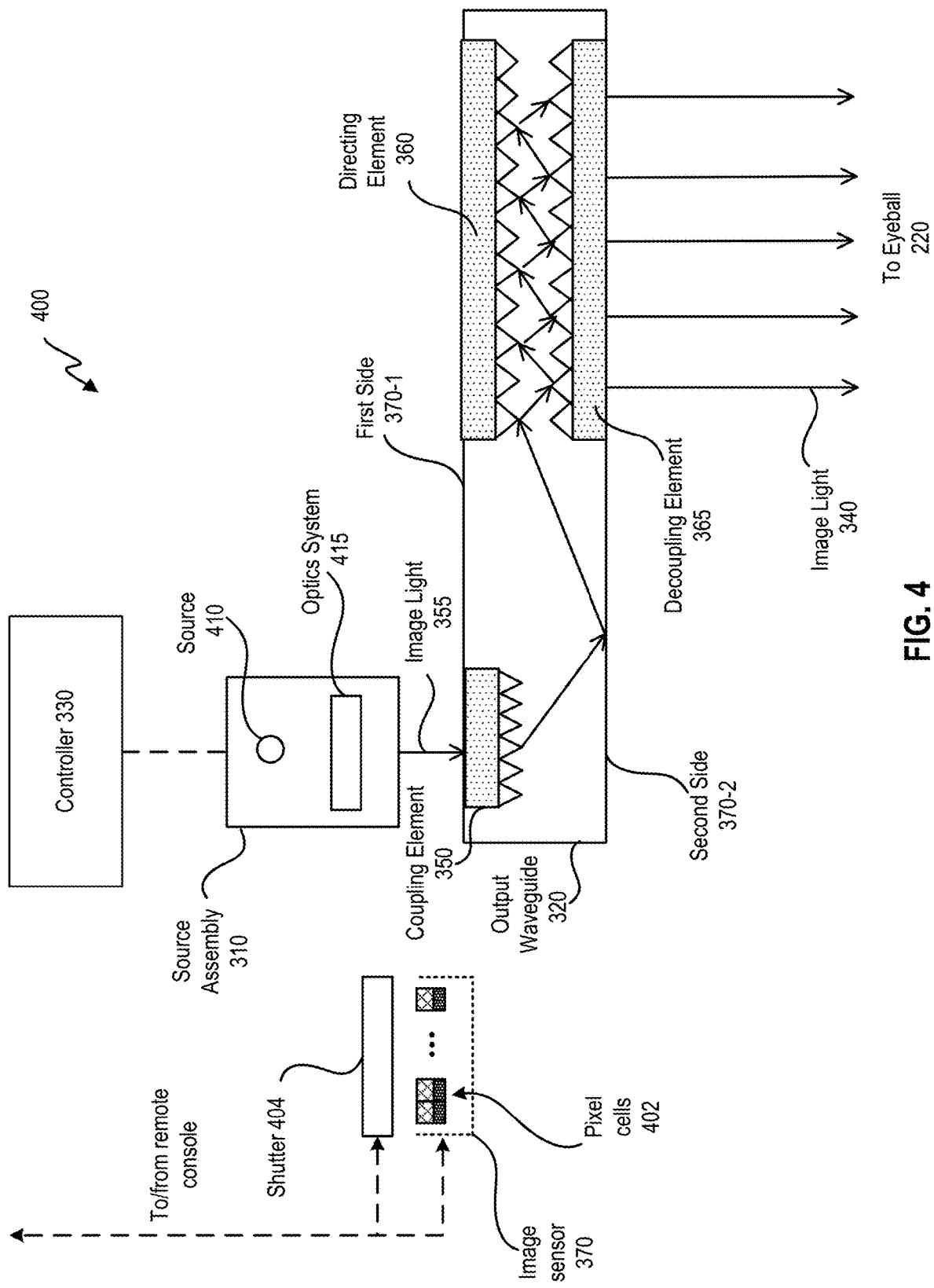
FIG. 4 illustrates a cross section of an example of the waveguide display.

FIG. 4 illustrates an embodiment of a cross section 400 of the waveguide display 300. The cross section 400 includes source assembly 310 and output waveguide 320. Source assembly 310 generates image light 355 in accordance with instructions from the controller 330. Source assembly 310 includes a source 410 and an optics system 415. Source 410 is a light source that generates coherent or partially coherent light. Source 410 may be, e.g., a laser diode, a vertical cavity surface emitting laser, and/or a light emitting diode. Optics system 415 includes one or more optical components that condition the light from source 410. Conditioning light from source 410 may include, e.g., expanding, collimating, and/or adjusting orientation in accordance with instructions from controller 330. The one or more optical components may include one or more lenses, liquid lenses, mirrors, apertures, and/or gratings. In some embodiments, optics system 415 includes a liquid lens with a plurality of electrodes that allows scanning of a beam of light with a threshold value of scanning angle to shift the beam of light to a region outside the liquid lens. Light emitted from the optics system 415 (and also source assembly 310) is referred to as image light 355.

Output waveguide 320 receives image light 355. Coupling element 350 couples image light 355 from source assembly 310 into output waveguide 320. In embodiments where coupling element 350 is a diffraction grating, a pitch of the diffraction grating is chosen such that total internal reflection occurs in output waveguide 320, and image light 355 propagates internally in output waveguide 320 (e.g., by total internal reflection), toward decoupling element 365.

Directing element 360 redirects image light 355 toward decoupling element 365 for decoupling from output waveguide 320. In embodiments where directing element 360 is a diffraction grating, the pitch of the diffraction grating is chosen to cause incident image light 355 to exit output waveguide 320 at angle(s) of inclination relative to a surface of decoupling element 365.

In some embodiments, directing element 360 and/or decoupling element 365 are structurally similar. Expanded image light 340 exiting output waveguide 320 is expanded along one or more dimensions (e.g., may be elongated along x-dimension). In some embodiments, waveguide display 300 includes a plurality of source assemblies 310 and a plurality of output waveguides 320. Each of source assemblies 310 emits a monochromatic image light of a specific band of wavelength corresponding to a primary color (e.g., red, green, or blue). Each of output waveguides 320 may be stacked together with a distance of separation to output an expanded image light 340 that is multi-colored.

Figure 5:
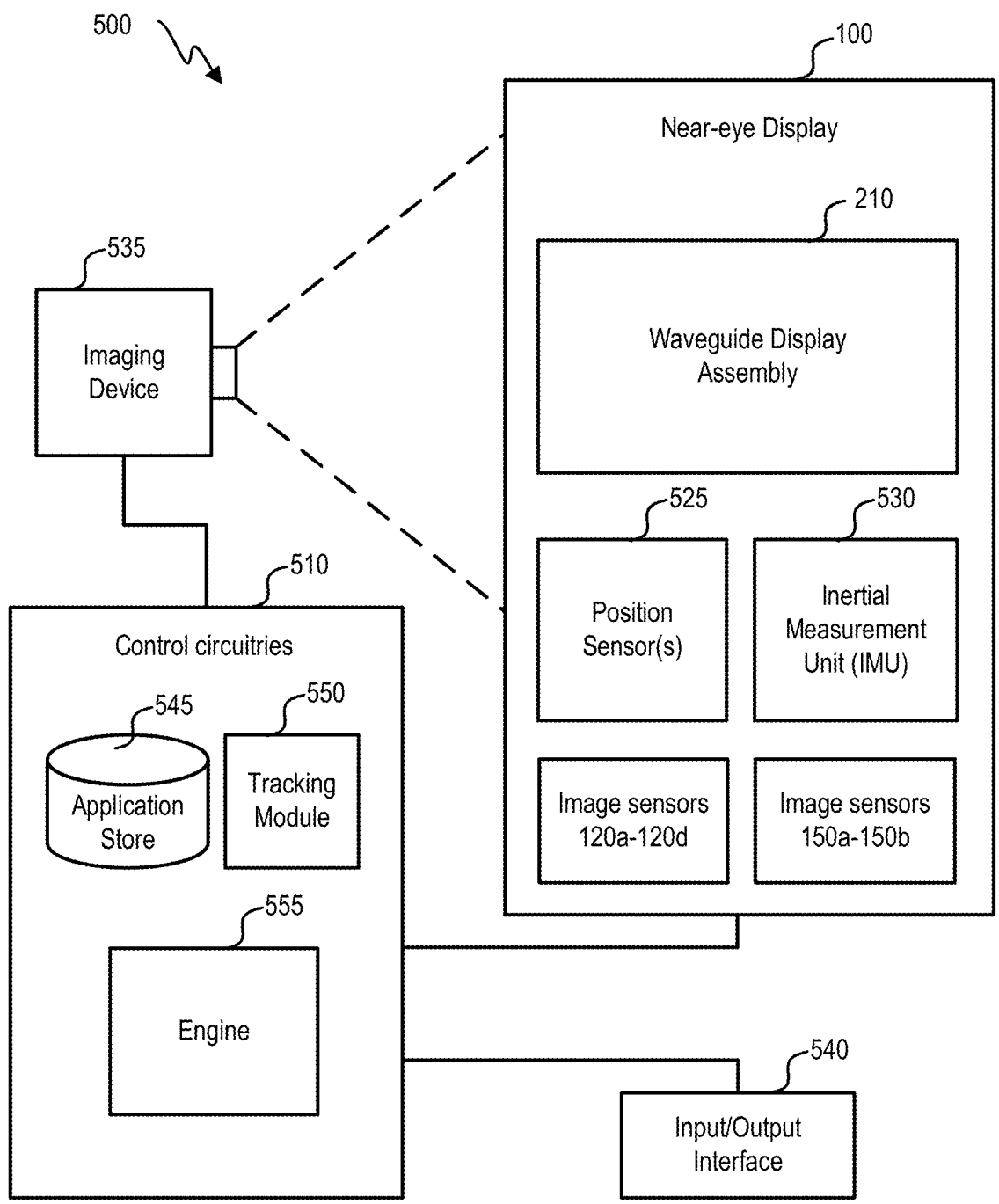
FIG. 5 is a block diagram of an example of a system including the near-eye display.

FIG. 5 is a block diagram of an embodiment of a system 500 including the near-eye display 100. The system 500 comprises control circuitries 510, an imaging device 535, and an input/output interface 540. Each of imaging device 535 and input/output interface 540 is coupled to control circuitries 510. System 500 can be configured as a head-mounted device, a wearable device, etc.

Imaging device 535 includes near-eye display 100, which is a display that presents media to a user. Examples of media presented by the near-eye display 100 include one or more images, video, and/or audio. In some embodiments, audio is presented via an external device (e.g., speakers and/or headphones) that receives audio information from near-eye display 100 and/or control circuitries 510 and presents audio data based on the audio information to a user. In some embodiments, near-eye display 100 may also act as an AR eyewear glass. In some embodiments, near-eye display 100 augments views of a physical, real-world environment, with computer-generated elements (e.g., images, video, sound, etc.).

Near-eye display 100 includes waveguide display assembly 210, image sensors 120a-120d and 150a-150b, one or more position sensors 525, and/or an inertial measurement unit (IMU) 530. Waveguide display assembly 210 includes source assembly 310, output waveguide 320, and controller 330 as depicted in FIG. 3. IMU 530 is an electronic device that generates fast calibration data indicating an estimated position of near-eye display 100 relative to an initial position of near-eye display 100 based on measurement signals received from one or more of position sensors 525. The estimation of the position of near-eye display 100 can also be based on or augmented by image data from image sensors 120a-120d of FIG. 1A, which can generate image data of a physical environment in which the user (and near-eye display 100) is located. For example, as described above, image sensors 120a-120d can be operated to perform 2D and 3D sensing of an environment at different times. The 2D and 3D image data of the environment can be processed by control circuitries 510 to determine, for example, the estimated position of near-eye display 100.

The input/output interface 540 is a device that allows a user to send action requests to the control circuitries 510. An action request is a request to perform a particular action. For example, an action request may be to start or end an application or to perform a particular action within the application.

Control circuitries 510 provides media to near-eye display 100 for presentation to the user in accordance with information received from one or more of: imaging device 535, near-eye display 100, and input/output interface 540. In some examples, control circuitries 510 can be housed within system 500 configured as a head-mounted device. In some examples, control circuitries 510 can be a standalone console device communicatively coupled with other components of system 500. In the example shown in FIG. 5, control circuitries 510 include an application store 545, a tracking module 550, and an engine 555.

Application store 545 stores one or more applications for execution by the control circuitries 510. An application is a group of instructions, that, when executed by a processor, generates content for presentation to the user. Examples of applications include: gaming applications, conferencing applications, video playback application, or other suitable applications.

Tracking module 550 calibrates system 500 using one or more calibration parameters and may adjust one or more calibration parameters to reduce error in determination of the position of the near-eye display 100. Moreover, tracking module 550 tracks movements of near-eye display 100 using slow calibration information from the imaging device 535. Tracking module 550 also determines positions of a reference point of near-eye display 100 using position information from the fast calibration information.

Engine 555 executes applications within system 500 and receives position information, acceleration information, velocity information, and/or predicted future positions of near-eye display 100 from tracking module 550. In some embodiments, information received by engine 555 may be used for producing a signal (e.g., display instructions) to waveguide display assembly 210 that determines a type of content presented to the user. For example, to provide an interactive experience, engine 555 may determine the content to be presented to the user based on a location of the user (e.g., provided by tracking module 550), a gaze point of the user (e.g., based on image data provided by imaging device 535), a distance between an object and user (e.g., based on image data provided by imaging device 535), etc.

Figure 6A:
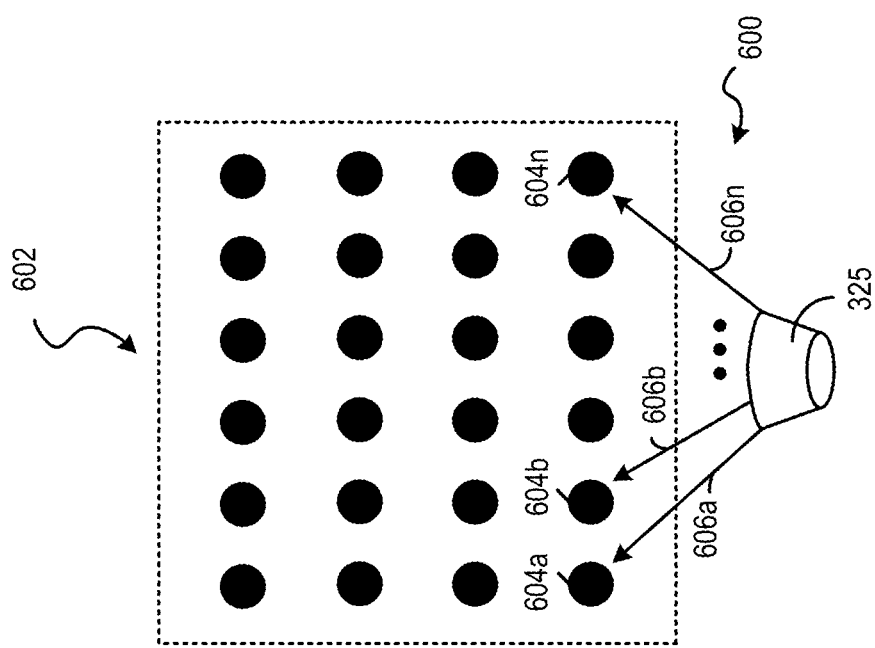
FIGS. 6A, 6B, 6C, and 6D illustrate depth sensing operations of a near-eye display comprising an illuminator according to the disclosed techniques.
Figure 6B:
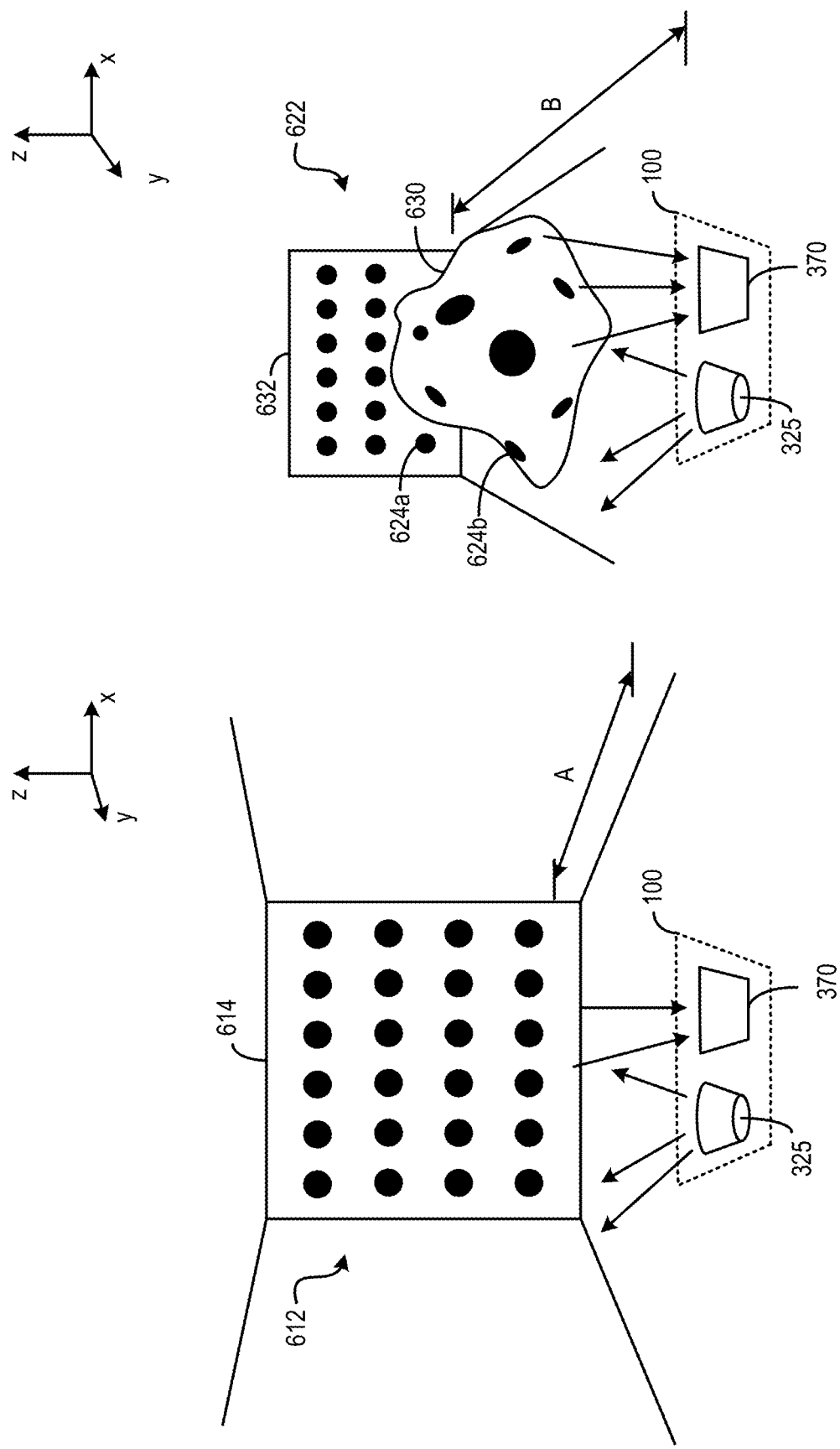

As described above, near-eye display 100 may include an illuminator (e.g., illuminator 325) and optical sensors (e.g., image sensors 120a-120d, image sensor 370, etc.) to perform depth sensing. The output of depth sensing can used to provide, for example, information about a location of near-eye display 100. FIG. 6A-FIG. 6D illustrate examples of depth sensing operations that can be performed by near-eye display 100. In one example, as shown in FIG. 6A, illuminator 325 can be configured to project structured light 600 having a pre-determined pattern 602. The pre-determined pattern may include, for example, a two-dimensional array of dots including a dot 604a, a dot 604b, a dot 604n, etc. Each dot may correspond to a light beam of structured light 600. For example, dot 604a can correspond to light beam 606a, dot 604b can correspond to light beam 606b, dot 604n can correspond to light beam 606n.

Structured light 600 can be reflected at different reflection points on a surface of an object to form a reflection pattern. The reflection pattern can be captured in an image by image sensor 370. The reflection pattern in the image may reveal the distance and orientation of each reflection point with respect to illuminator 325. For example, reflection pattern 612 shown on the left of FIG. 6B can be formed by projecting pattern 602 on a planar surface 614 facing illuminator 325 directly at a distance A from near-end display 100 along the Y axis. On the other hand, reflection pattern 622 shown on the right of FIG. 6B can be formed by projecting pattern 602 on an object 630 and an object 632. Compared with the uniform dot pattern in reflection pattern 612, the dots of reflection pattern 622 may be non-uniformly shaped and sized due to the different distances and orientations of different reflection points on objects 630 and 632 with respect to near-end display 100. For example, compared with reflection pattern 612, a dot 624a in reflection pattern 622 may appear smaller on a reflection point of object 632 that is further away from near-eye display 100 than distance A. A dot 624b in reflection pattern 622 may also appear distorted on a reflection point of object 630 not facing near-end display 100 directly. An image processor can compare reflection pattern 622 against a reference reflection pattern (e.g., reflection pattern 612) and determine the size and shape differences between the dots in reflection patterns 612 and 622. Based on the size and shape differences, the distances and orientations of the reflection points on objects 630 and 632 with respect to near-eye display 100 can be determined. Based on the distances and orientations information, a 3D image including a distribution of depths of objects 630 and 632 with respect to near-eye display 100 can be generated.

Figure 6C:
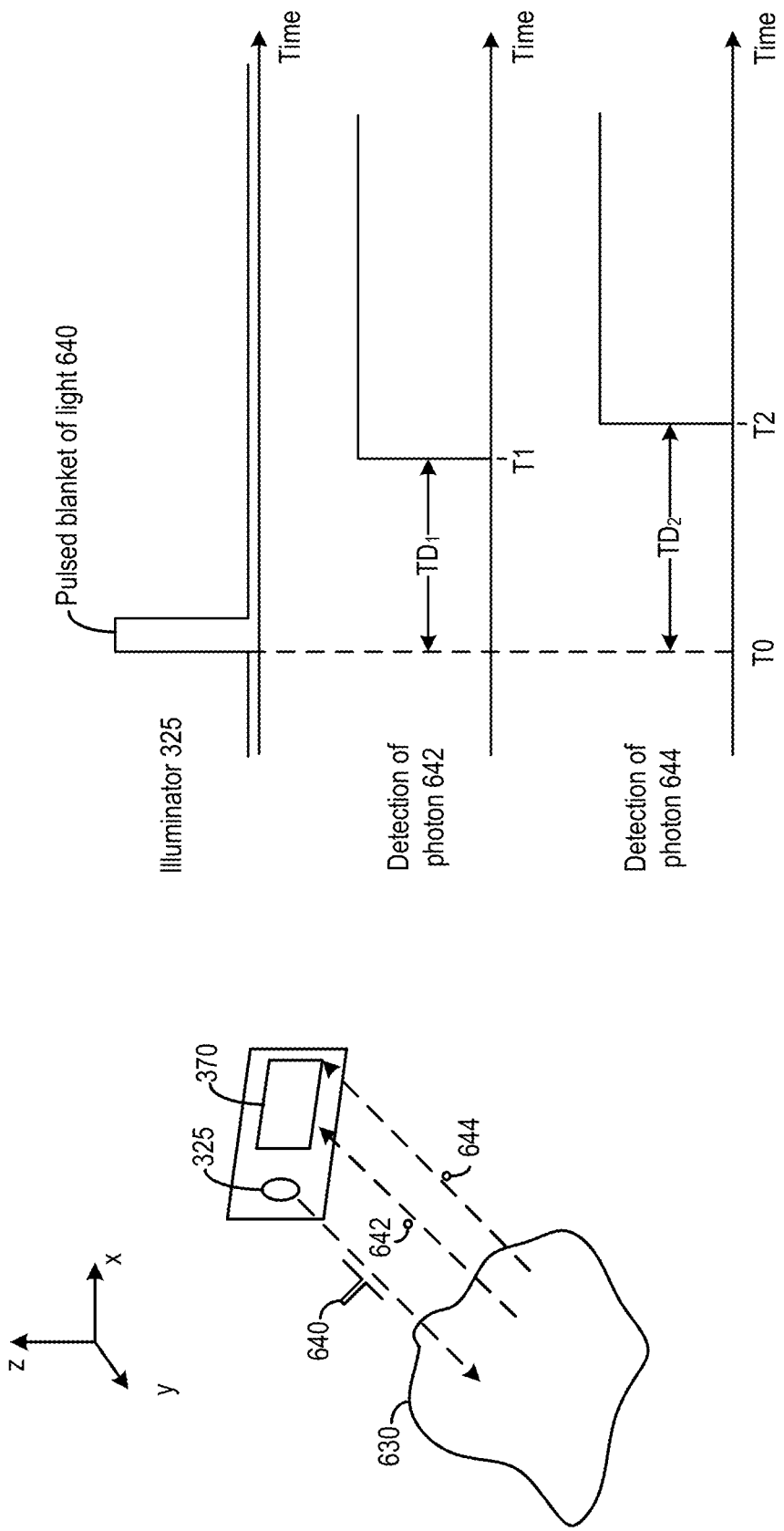

FIG. 6C illustrates another example of depth sensing. In FIG. 6C, depth sensing can be performed using time-of-flight measurement operation. In FIG. 6C, illuminator 325 can be controlled to emit, within a very short duration, a blanket of light 640 towards object 630 at time T0. The light can be reflected off at different reflection points of object 630, and the photons of the reflected light (e.g., photons 642 and 644) can be received at image sensor 370. The time differences between when the time when the blanket of light is emitted (time T0) and the times when the first photons of the reflected light are received at image sensor 370 (times T1 and T2), represented by $TD_1$ and $TD_2$ in FIG. 6C, can be used to create a spatial distribution of time-of-flights between illuminator 325 and the reflection points from which photons 642 and 644 are reflected. Different reflection points of object 630 having different distances with respect to near-eye display 100 can have different time-of-flights. Based on the time-of-flights distribution, a distribution of depths of object 630 with respect to near-eye display 100 can be generated.

Figure 6D:
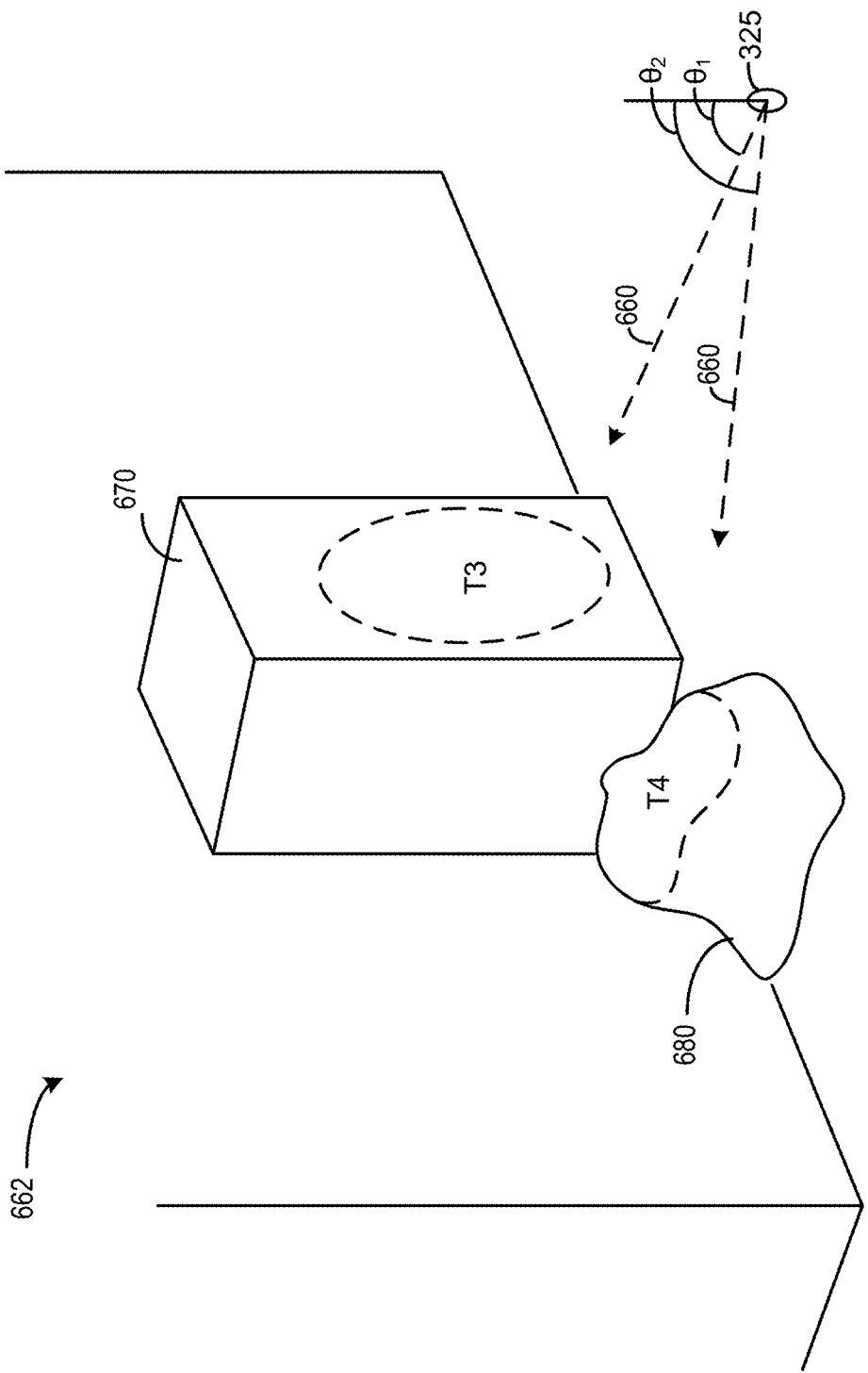

FIG. 6D illustrates another example of depth sensing. In FIG. 6D, illuminator 325 can project light 660 (which may include structured light 600, blanket of light 640, etc.) towards different locations of environment 662, which includes objects 670 and 680, for depth sensing at different times. For example, illuminator 325 can steer light 660 at angle $\theta_1$ (e.g., with respect to the Z-axis) at time T3 towards object 670, and then steer light 660 at angle $\theta_2$ (with respect to the Z-axis) at time T4 towards object 680. In FIG. 6D, illuminator 325 can be configured to perform a scanning process to sequentially project light to different locations of environment 662 to generate a 3D image of the environment. Compared with a case where illuminator 325 projects a number of light beams over the entirety of environment 662 at one time, the arrangement in FIG. 6D allows illuminator 325 to project the same number of light beams over a small area within environment 662, to improve depth sensing resolution. Meanwhile, the sequential scanning enables depth sensing operations to be performed for the entirety of environment 662.

Figure 7:
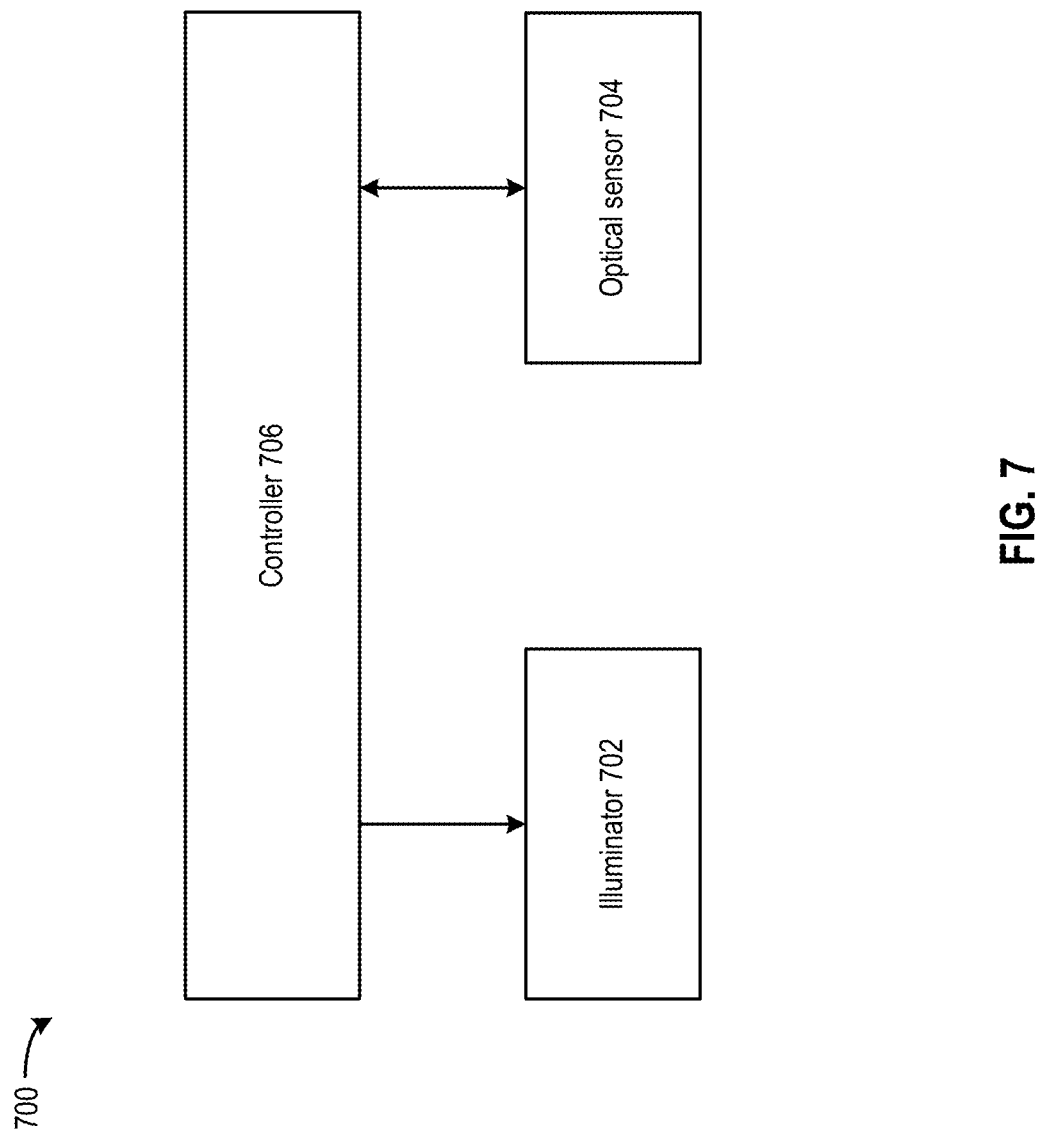
FIG. 7 illustrates an example of a system comprising an illuminator according to the disclosed techniques.

FIG. 7 illustrates an embodiment of a depth sensing module 700. Depth sensing module 700 can be part of near-eye display 100. Depth sensing module 700 can perform depth sensing based on techniques described above, and provide 3D image data to control circuitries 510 of FIG. 5 to control the display content of near-eye display 100. In FIG. 7, depth sensing module 700 may include an illuminator 702, an optical sensor 704, and a controller 706. Illuminator 702 may correspond to illuminator 325 of FIG. 6A-FIG. 6D and can be configured to generate structured light 600 and/or blanket of light 640. In some examples, illuminator 702 may include a laser to emit infra-red light. Optical sensor 704 may correspond to image sensor 370 of FIG. 6A-FIG. 6D. Optical sensor 704 may include a pixel cell array, with each pixel cell having one or more photodiodes and circuitries configured to measure an intensity of reflected light received at the pixel cell, to measure a time-of-arrival of a first photon of the reflected light at the pixel cell, etc. The intensity of light measurement can be used to generate an image of a reflection pattern, whereas the time of arrival information can be used to generate a spatial distribution of time-of-flight.

Controller 706 can control and synchronize the operations of illuminator 702 and optical sensor 704 to perform depth sensing. For example, controller 706 can set an exposure period for generation of a 3D image frame. During the exposure period, controller 706 can control the time when illuminator 702 emits structured light 600 and/or blanket of light 640, and control the pixel cells of optical sensor 704 to detect reflected light from one or more objects to perform intensity measurement and/or time-of-flight measurement. In some examples, controller 706 may also perform the scanning process of FIG. 6D and control illuminator 702 to sequentially steer light (structured light 600, blanket of light 640) at different angles within the exposure period. Controller 706 may also receive the measurement data from optical sensor 704, and determine a distribution of depths among different reflection surfaces of the object with respect to near-eye display 100, to create a 3D image.

Figure 8A:
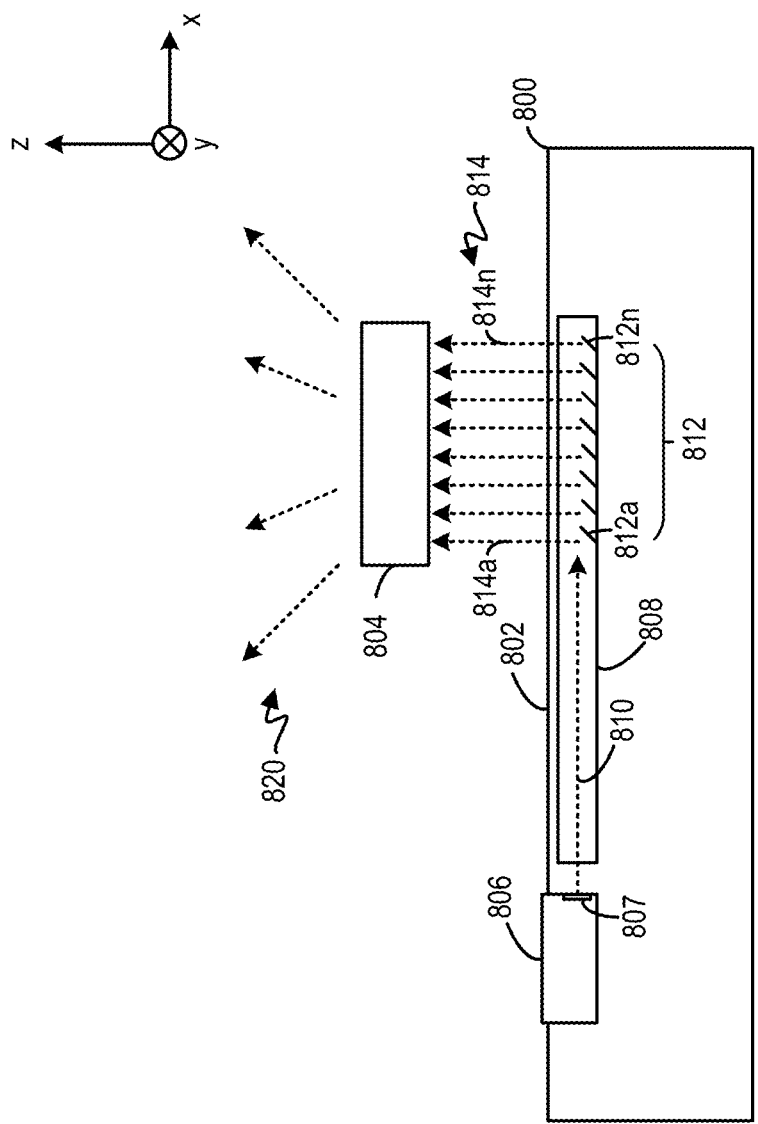
FIGS. 8A, 8B, 8C, 8D, and 8E illustrate embodiments of an illuminator according to the disclosed techniques.

FIG. 8A illustrate an embodiment of illuminator 702 of FIG. 7. FIG. 8A shows a side view of illuminator 702 (e.g., viewing along the Y-axis). As shown in FIG. 8A, illuminator 702 may include a photonic integrated circuit (PIC) 800 and a diffractive optical element (DOE) 804. PIC 800 may include a semiconductor substrate (e.g., silicon, silicon nitride, etc.) having a surface 802. The semiconductor substrate may be compatible with complementary metal-oxide-semiconductor (CMOS) fabrication. PIC 800 may include a semiconductor laser diode 806 and associated control circuitries heterogeneously integrated with the semiconductor substrate. PIC 800 further includes a silicon waveguide 808. Semiconductor laser diode 806 and waveguide 808 can be arranged along a first axis parallel with surface 802 (e.g., the X-axis). Semiconductor laser diode 806 may include materials from groups III-V, and may be configured to emit a light beam 810 in the near infra-red range (e.g., having a wavelength of 850 nanometers, 940 nanometers, etc.). In some embodiments, semiconductor laser diode 806 may include an edge emitting laser diode (EELD) to emit light beam 810 via a light emitting surface 807 perpendicular to surface 802 of PIC 800. Waveguide 808 can receive light beam 810 from light emitting surface 807 and propagate light beam 810 along the X-axis.

Waveguide 808 further includes a plurality of optical turning features 812 including, for example, optical turning features 812a, 812n, etc. Optical turning features 812 can direct light beam 810 out of waveguide 808 as a plurality of light beams 814. Each of optical turning features 812 (e.g., optical turning feature 812a, optical turning feature 812n, etc.) can receive light beam 810 and divert light beam 810 to propagate along a second axis (e.g., the Z-axis) to form one of light beams 814 (e.g., light beam 814a, light beam 814n, etc.). Optical turning features 812 may include, for example, diffractive gratings, optical facets, refractive index structures, volume holograms, optical beam splitting prisms, etc. Each of optical turning features 812 can divert light beam 810 (e.g., by reflection or refraction) to propagate along the second axis such that light beams 814 propagate as a one-dimensional array of collimated light beams. DOE 804 may include optical elements to generate output light 820 as structured light or as a blanket of light. DOE 804 may include various optical devices including, for example, Fresnel lens, holographic optical elements, binary optics, etc.

Figure 8B:
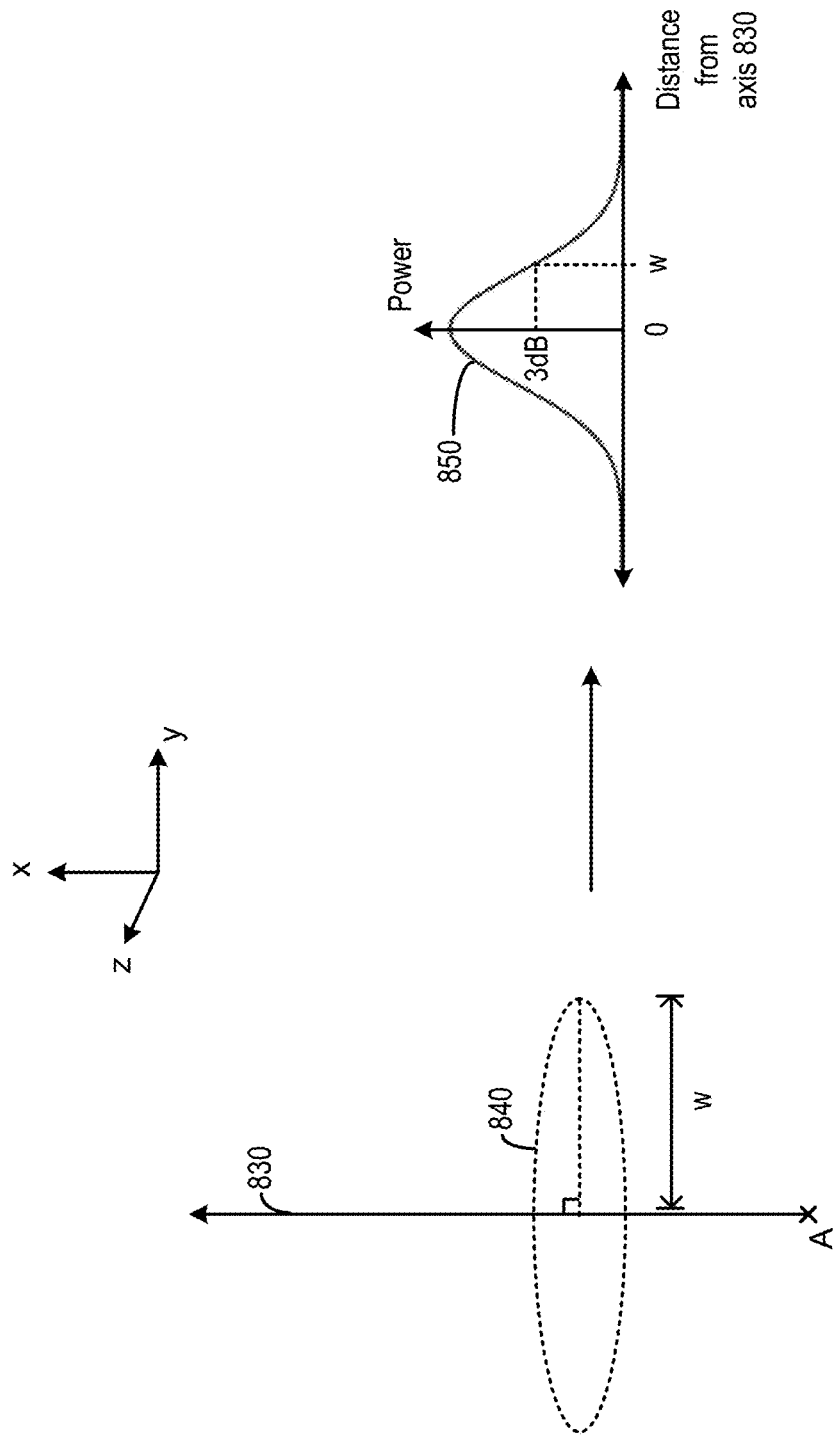

FIG. 8B illustrates an example of spatial power distribution of light beam 810. In the example of FIG. 8B, light beam 810 can originate at point A (e.g., at output of laser diode 806) aligned with an axis 830 and propagates along axis 830, which may be parallel with the X-axis. At any point along axis 830, the power of light beam 810 can be at a maximum, and the power decreases at locations away from axis 830. The spatial power distribution of light beam 810 on a plane 840 perpendicular to axis 830 can follow a Gaussian distribution 850 as shown in FIG. 8B. A beam width of light beam 810, denoted as w in FIG. 8B along an axis perpendicular to X-axis (e.g., the Y-axis), can correspond to a location on a plane (e.g., plane 840) where the power drops by 50% (3 dB) with respect to the maximum power on plane 840. A light beam 814, formed by diversion of light beam 810 by an optical turning feature 812, may have a similar Gaussian power distribution and a similar width as light beam 810.

It is desirable to reduce the beam width of light beam 814 and to have more light power concentrated within a narrow width, to improve the spatial resolution of depth sensing. For example, when light beam 814 impacts a surface of an object to form a reflection pattern (e.g., dot 624a of FIG. 6B), the intensity distribution of the reflection pattern on the surface may also follow the Gaussian power distribution, and the edges of the reflection pattern may become blurred. The blurring can complicate the identification of the reflection patterns (e.g., by matching the patterns with reference patterns), as well as to the size and shape determination, all of which can introduce errors to depth sensing. Moreover, because each reflection pattern (e.g., a dot) covers a larger reflection area, the reflection patterns may overlap, and neighboring reflection areas become indistinguishable. The depth sensing resolution may be reduced as a result.

Figure 8C:
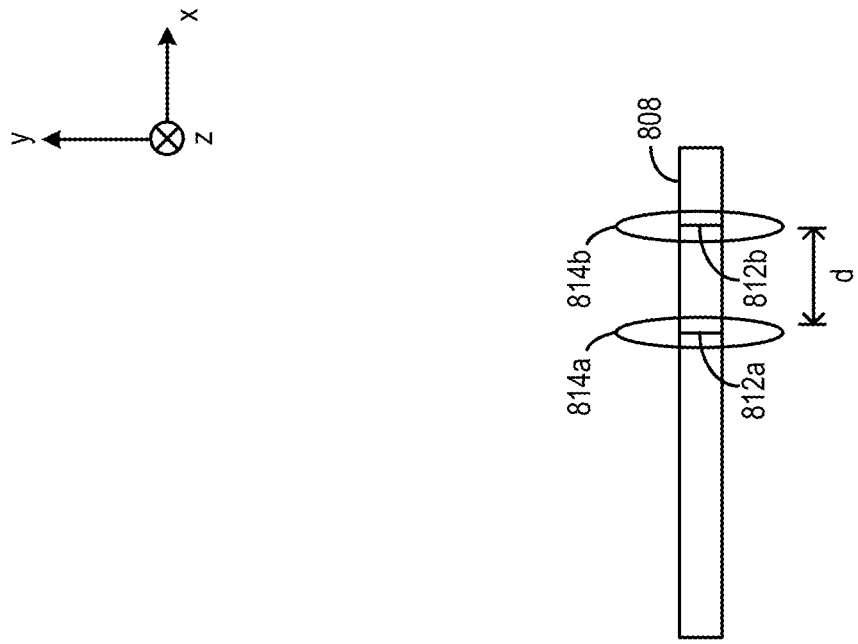
Figure 8C:
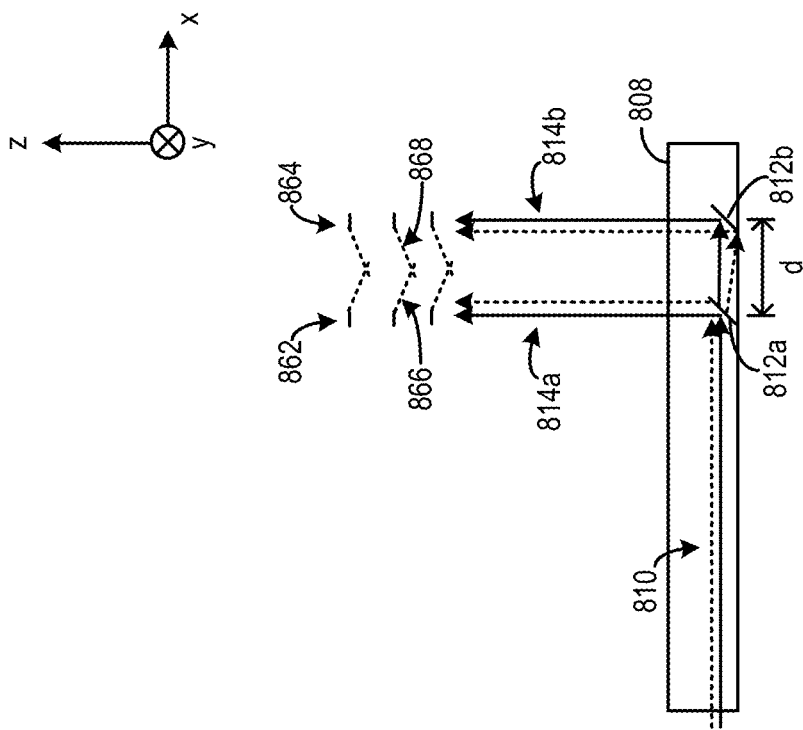

In some embodiments, the spacing between adjacent optical turning features 812 within waveguide 808 along the X-axis can be configured to reduce the beam width of light beams 814 based on interference. FIG. 8C illustrates an example of configuration of optical turning features 812 to reduce beam width. The diagram on the left shows a side view of waveguide 808, whereas the diagram on the right shows a top view of waveguide 808. In FIG. 8C, the solid arrows represent part of the light beams having the maximum power, whereas the dotted arrows represent part of the light beams having reduced power. Optical turning features 812a and 812b are separated by a distance d along the X axis. Light beam 810 propagates along the X-axis and first impacts optical turning feature 812a. Part of light beam 810 (including part of both of the maximum power portion and the reduced power portion) is diverted by optical turning feature 812a to form light beam 814a. The remaining part of light beam 810 propagates through an additional distance d and impacts optical turning feature 812b, which can divert the light beam to form light beam 814b.

The distance d between optical turning features 812a and 812b introduces a phase shift in light beam 814b with respect to light beam 814a. To reduce the beam width of light beams 814a and 814b, the distance d, which introduces a phase shift between light beams 814a and 814b, can be configured to introduce destructive interference between the reduced power portions of the light beams (represented by the dotted lines). For example, the distance d can be configured (e.g., based on the wavelength of light beam 810) to introduce a phase shift of −180 degrees between light beams 814a and 814b. The wave fronts 862 and 864 of the maximum power portions of light beams 814a and 814b do not overlap, while the wave fronts 866 and 868 of the reduced power portions of light beams 814a and 814b overlap and cancel each other by destructive interference caused by the phase difference of −180 degrees. With such arrangements, the beam width of light beams 814a and 814b can be reduced along the X-axis, as shown in the right diagram of FIG. 8C.

Figure 8D:
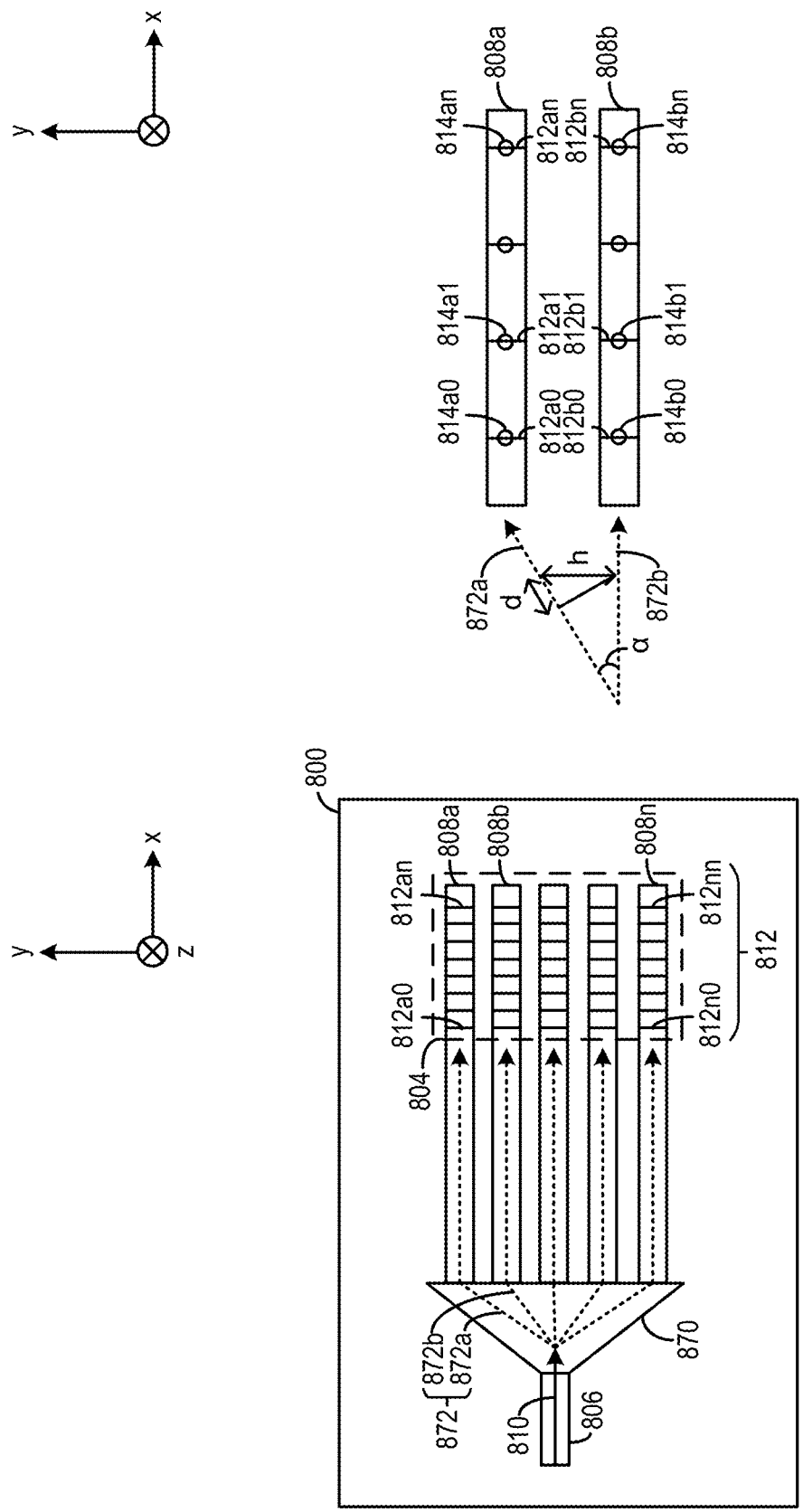

FIG. 8D illustrates another embodiment of illuminator 702 of FIG. 7. The right diagram of FIG. 8D shows a top view of illuminator 702. As shown in FIG. 8D, illuminator 702 may include PIC 800 and diffractive optical element (DOE) 804. PIC 800 may include semiconductor laser diode 806 and associated control circuitries heterogeneously integrated with the semiconductor substrate. PIC 800 further includes a plurality of silicon waveguides 808 (e.g., waveguides 808a, 808b, 808n, etc.) and a star coupler 870 that couples laser diode 806 to each of the plurality of silicon waveguides 808. Laser diode 806 can emit light beam 810, which is then split by star coupler 870 into split light beams 872 (e.g., 872a, 872b, etc.) and coupled into each of the plurality of silicon waveguides 808. Each of the plurality of silicon waveguides 808 can propagate the split light beams 872 along the X-axis. Each of the plurality of silicon waveguides further includes optical turning features 812 (e.g., 812a0, 812an, 812n0, 812nn, etc.) to divert a split light beam 872 to form a one dimensional array of collimated light beams 814. For example, silicon waveguide 808a can divert split light beam 872a to form collimated light beams 814a0, 814a1, 814an, etc. Silicon waveguide 808b can divert split light beam 872b to form collimated light beams 814b0, 814b1, 814bn, etc. The plurality of silicon waveguides 808 can be arranged along an axis perpendicular to the X-axis (e.g., the Y-axis), such that a two-dimensional array of collimated light beams 814 can be emitted. The two-dimensional array of collimated light beams 814 can be diffracted by DOE to form output light 820, which can include structured light or a blanket of light.

In addition to forming a two-dimensional array of collimated light beams 814, adjacent silicon waveguides 808 (e.g., 808a and 808b) can also be spaced apart by a distance h to create destructive interference between split light beams 872a and 872b to reduce their beam widths along the Y-axis. Referring to the diagram on the right of FIG. 8D, the distance h can be related to additional distance d travelled by split light beam 872a with respect to split light beam 872b according to following equation:

$$d = h \times \sin(\alpha) \qquad \text{(Equation 1)}$$

In Equation 1, d is the additional distance travelled by split light beam 872a with respect to split light beam 872b, h is the separation between silicon waveguides 808a and 808b, whereas $\alpha$ is an angle formed between split light beams 872a and 872b. The value h can be configured such that the additional distance d introduces a phase shift of −180 degrees between split light beams 872a and 872b. The phase shift allows cancelling of reduced power portions of light beams 872a and 872b to reduce the width of light beams 814a and 814b along the Y-axis. With such arrangements, a two-dimensional array of collimated light beams 814 (e.g., having reduced width along both the X and Y axes) can be formed.

Figure 8E:
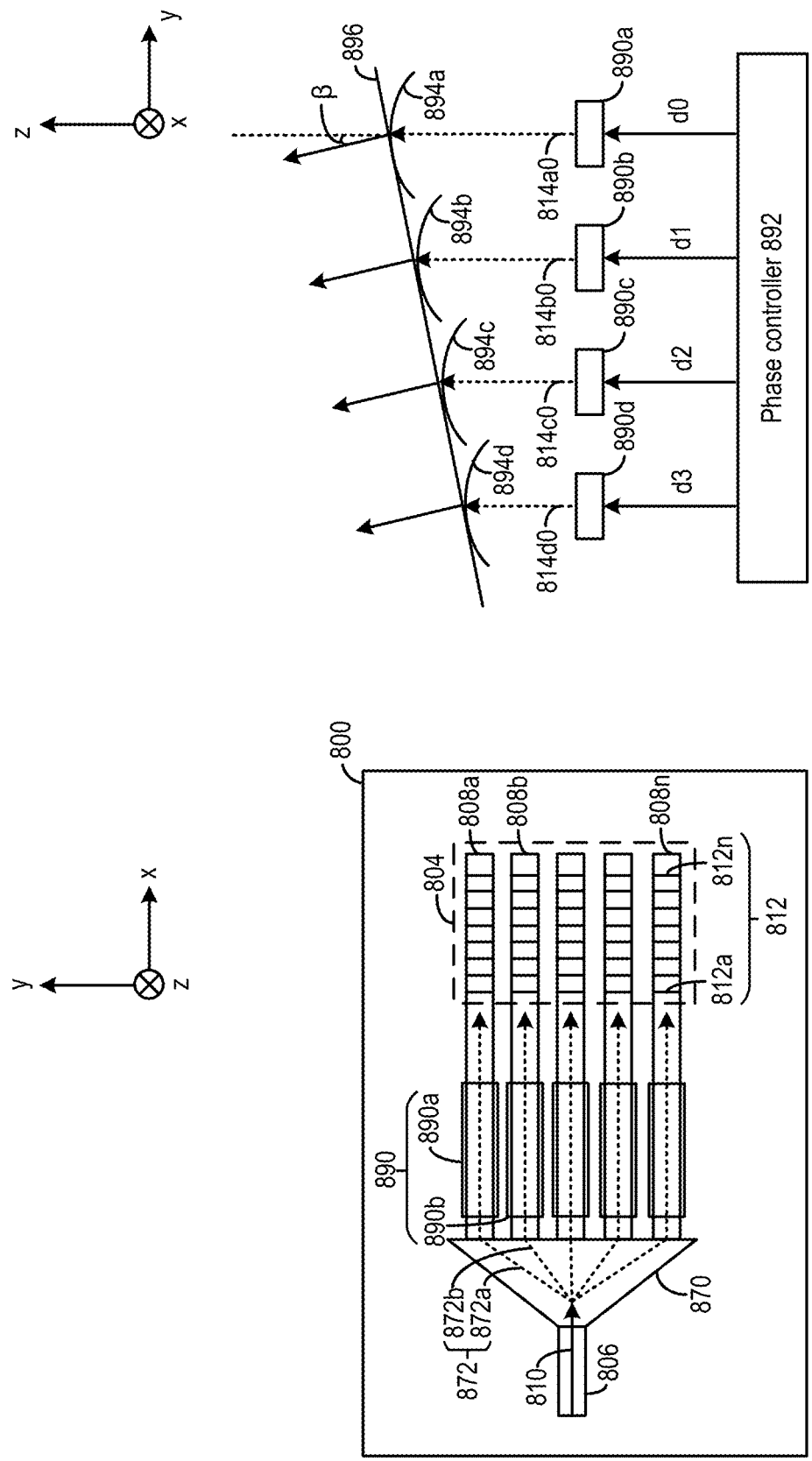

FIG. 8E illustrates another embodiment of illuminator 702 of FIG. 7. The right diagram of FIG. 8E shows a top view of illuminator 702. As shown in FIG. 8E, illuminator 702 may include PIC 800, diffractive optical element (DOE) 804, semiconductor laser diode 806, a plurality of silicon waveguides 808 (e.g., waveguides 808a, 808b, 808n, etc.) and a star coupler 870 that couples laser diode 806 to each of the plurality of silicon waveguides 808. Laser diode 806 can emit light beam 810, which is then split by star coupler 870 into split light beams 872 (e.g., 872a, 872b, etc.) and coupled into each of the plurality of silicon waveguides 808. Each of the plurality of silicon waveguides further includes optical turning features 812 (e.g., 812a, 812n, etc.) to divert the split light beams 872 to form collimated light beams 814, which can be diffracted by DOE to form output light 820.

In addition, PIC 800 includes a plurality of phase shifters 890 coupled with the plurality of silicon waveguides 808. Each of the plurality of phase shifters 890 can be controlled to introduce a phase delay to the split light beam in each respective silicon waveguide. For example, phase shifter 890a is coupled with silicon waveguide 808a and can be controlled to set a phase delay of split light beam 872a as well as collimated light beams 814a, whereas phase shifter 890b is coupled with silicon waveguide 808b and can be controlled to set a phase delay of split light beam 872b as well as collimated light beams 814. Phase shifters 890 can be controlled by a phase shift controller 892 which can be integrated into PIC 800 or included as a separate component from PIC 800.

In some embodiments, phase shift controller 892 can be configured to set the phase delays at phase shifters 890 to steer collimated light beams 814 at an angle $\beta$ with respect to the Z-axis (or with respect to surface 802 of PIC 800). For example, as shown on the right diagram of FIG. 8D, phase shifter 890a can be configured to introduce a phase delay of d0 to split light beam 814a and collimated light beam 814a0, phase shifter 890b can be configured to introduce a phase delay of d1 to split light beam 814b and collimated light beam 814b0, phase shifter 890c can be configured to introduce a phase delay of d2 to split light beam 814c and collimated light beam 814c0, whereas phase shifter 890d can be configured to introduce a phase delay of d3 to split light beam 814d and collimated light beam 814d0. The delays can be made progressively larger starting from d0, followed by d1, and then d2, with d3 being the maximum. With such arrangements, the wave fronts 894a, 894b, 894c, and 894d of collimated light beams 814a0, 814b0, 814c0, and 814d0 also have progressively large delays, and the wave fronts can combine to form a wave front 896 that travels along direction 898 which forms the angle $\beta$ with respect to the Z-axis. Phase shifters 890 can be configured to set a phase delay of the split light beams based on various techniques including, for example, thermoelectric effect, charge injection, etc.

Figure 9:
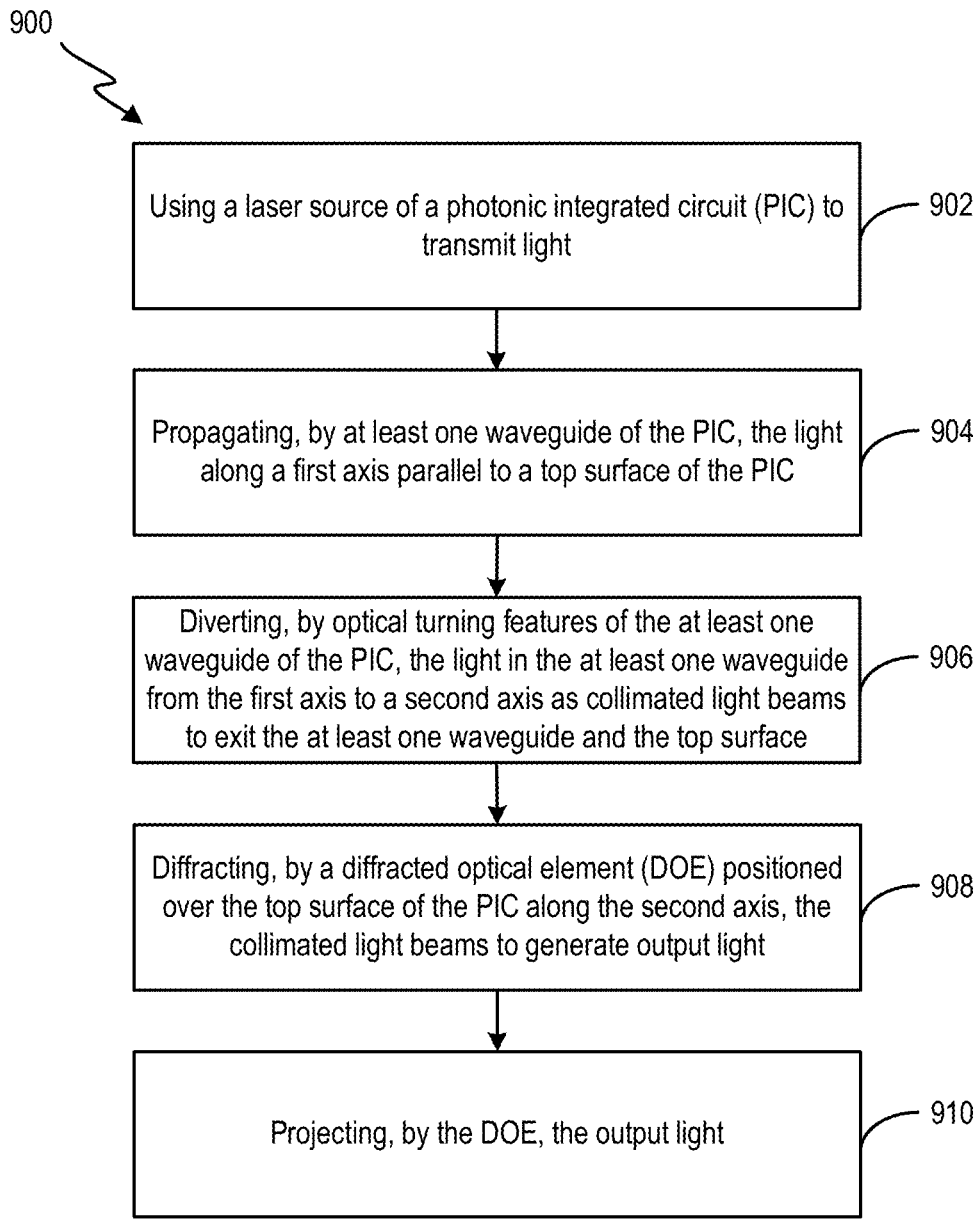
FIG. 9 is flowchart illustrating an example process of performing depth sensing according to the disclosed techniques.

FIG. 9 illustrates an embodiment of a flowchart of a process 900. Process 900 can be performed by an illuminator, such as illuminator 702, which can be controlled by a controller (e.g., controller 706) to emit light for depth sensing. Illuminator 702 may include a photonic integrated circuit (PIC), such as PIC 800. The PIC may include a laser source. Illuminator 702 further include at least one waveguides (e.g., waveguide 808), and a diffractive optical element (DOE) positioned over a top surface of the PIC. The at least one waveguides include optical turning features, such as optical turning features 812.

Process 900 begins with step 902, in which illuminator 702 uses a laser source of the PIC to transmit light. The laser source may include laser diode 806, such as an edge-emitting laser diode (EELD), to emit the light.

In step 904, the at least one waveguide propagates the light along a first axis parallel to a top surface of the PIC towards the optical turning features. The at least one waveguide may be positioned adjacent to the laser source along the first axis and receive the light via a light emitting surface of the laser source that is perpendicular to the top surface.

In step 906, the optical turning features diverts the light propagating in the at least one waveguide from the first axis to a second axis as collimated light beams to exit the at least one waveguide and the top surface of the PIC. The optical turning features may include, for example, diffractive gratings, optical facets, refractive index structures, volume holograms, optical beam splitting prisms, etc. The distance between optical turning features can be configured to introduce certain phase shift among the light beams. The phase shifts can cause destructive interference and reduce the beam width of the collimated light beams. The reduced beam width can also improve the resolution of the depth sensing operation using the collimated light beams.

In step 908, the DOE positioned over the top surface of the PIC diffracts the collimated light beams to generate output light. The DOE may include optical elements to generate the output light as structured light or as a blanket of light. The DOE may include various optical devices including, for example, Fresnel lens, holographic optical elements, binary optics, etc.

In step 910, the illuminator projects the output light (e.g., structured light, blanket of light, etc.) from the DOE to perform the depth sensing operation. For example, the output light can be projected towards an object, which can reflect the light. An optical sensor can receive the reflected light. Based on the timing difference between the transmission of the output light and the reception of the reflected light, a distance between the optical sensor/illuminator and the object can be determined.

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, and/or hardware.

Steps, operations, or processes described may be performed or implemented with one or more hardware or software modules, alone or in combination with other devices. In some embodiments, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations described. The apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

The language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

The invention claimed is:

1. An apparatus comprising:
   a photonic integrated circuit (PIC), the PIC including a laser source and at least one waveguide, the at least one waveguide including optical turning features, the at least one waveguide configured to propagate light transmitted by the laser source along a first axis parallel to a top surface of the PIC, and the optical turning features configured to divert the light to form collimated light beams that propagate along a second axis to exit the at least one waveguide and the top surface; and
   a diffractive optical element (DOE) positioned over the top surface of the PIC along the second axis and configured to diffract the collimated light beams and output the diffracted collimated light beams.

2. The apparatus of claim 1, wherein the laser source comprises a light emitting surface perpendicular to the top surface of the PIC; and
   wherein the laser source is configured to emit the light via the light emitting surface to the at least one waveguide.

3. The apparatus of claim 1, wherein the DOE is configured to diffract the collimated light beams to form structured light having pre-determined patterns for image-based depth sensing.

4. The apparatus of claim 1, wherein the DOE is configured to diffract the collimated light beams to project a blanket of diffused light for time-of-flight measurement.

5. The apparatus of claim 1, wherein the optical turning features are configured such that the second axis is perpendicular to the top surface of the PIC.

6. The apparatus of claim 1, wherein the optical turning features include optical gratings; and
wherein a distance between two of the optical gratings along the first axis is configured based on a target beam width along the first axis.

7. The apparatus of claim 1, wherein the at least one waveguide comprises a plurality of waveguides arranged along a third axis, the third axis being perpendicular to the first axis and parallel with the top surface of the PIC, each of the plurality of waveguides comprising optical turning features;
wherein each of the plurality of waveguides is configured to propagate the light transmitted by the laser source along the first axis parallel with the top surface of the PIC; and
wherein the optical turning features of the plurality of waveguides are configured to divert the light propagated in the plurality of waveguides to form a two-dimensional array of collimated light beams that propagate along the second axis to exit the plurality of waveguides and the top surface of the PIC.

8. The apparatus of claim 7, wherein a distance between two of the plurality of waveguides along the third axis is configured based on a target beam width along the third axis.

9. The apparatus of claim 7, further comprising a star coupler coupled with the laser source with the plurality of waveguides.

10. The apparatus of claim 7, wherein an angle between the top surface of the PIC and the second axis along which the two-dimensional array of collimated light beams propagate is adjustable.

11. The apparatus of claim 10, further comprising a plurality of phase shifters;
wherein each of the plurality of phase shifters is coupled with each of the plurality of waveguides; and
wherein each of the plurality of phase shifter is configured to introduce a phase delay in each of the collimated light beams that exits from the each of the plurality of waveguides.

12. The apparatus of claim 11, further comprising a phase shifter controller;
wherein the phase shifter controller is configured to set the phase delay at each of the plurality of phase shifters to set the angle between the second axis and the top surface.

13. The apparatus of claim 1, wherein the PIC includes a Silicon substrate.

14. The apparatus of claim 1, wherein the laser source comprises materials from one of Groups III, IV, or V.

15. The apparatus of claim 1, wherein the DOE comprises a lens.

16. The apparatus of claim 1, wherein the DOE comprises a light diffuser panel.

17. An apparatus, comprising:
an illuminator comprising:
a photonic integrated circuit (PIC), the PIC including a laser source and at least one waveguide, the at least one waveguide including optical turning features, the at least one waveguide configured to propagate light transmitted by the laser source along a first axis parallel to a top surface of the PIC, and the optical turning features configured to divert the light to form collimated light beams that propagate along a second axis to exit the at least one waveguide and the top surface; and
a diffractive optical element (DOE) over the top surface of the PIC along the second axis and configured to diffract the collimated light beams and project the diffracted collimated light beams towards an object;
an optical sensor configured to generate a detection output based on detecting at least part of the diffracted collimated light beams reflected off the object; and
a controller configured to determine a depth of the object with respect to the apparatus based on the detection output.

18. The apparatus of claim 17, wherein the DOE is configured to diffract the collimated light beams to form structured light having pre-determined patterns;
wherein the optical sensor further comprises a pixel array configured to obtain an image of the pre-determined patterns on a surface of the object based on detecting at least part of the diffracted collimated light beams reflected off the surface of the object; and
wherein the controller is configured to estimate a distance between the illuminator and each of a plurality of positions on the surface of the object based on the image to determine the depth.

19. The apparatus of claim 17, wherein the DOE is configured to diffract the collimated light beams to form a blanket of light;
wherein the optical sensor is configured to determine time-of-arrival information of photons of the blanket of light reflected off a surface of the object; and
wherein the controller is configured to estimate a distance between the illuminator and each of a plurality of positions on the surface of the object based on the time-of-arrival information.

20. A method, comprising:
controlling a laser source of a photonic integrated circuit (PIC) to transmit light;
propagating, by at least one waveguide of the PIC, the light along a first axis parallel to a top surface of the PIC;
diverting, by optical turning features of the at least one waveguide of the PIC, the light from the first axis to a second axis as collimated light beams to exit the at least one waveguide and the top surface;
diffracting, by a diffracted optical element (DOE) positioned over the top surface of the PIC along the second axis, the collimated light beams to form output light; and
projecting, by the DOE, the output light.

* * * * *